United States Patent [19]
Yoshimura et al.

[11] Patent Number: 5,973,076
[45] Date of Patent: *Oct. 26, 1999

[54] POLYBUTENE-1 RESIN COMPOSITION AND A METHOD OF ACCELERATING THE CRYSTAL TRANSFORMATION THEREOF

[75] Inventors: Masafumi Yoshimura, Kuze-gun; Naoki Ikeda, Soraku-gun; Kazuaki Mizoguchi, Uji; Hiroshi Kitagawa, Otsu, all of Japan

[73] Assignee: New Japan Chemical Co., Ltd., Kyoto, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/564,801

[22] Filed: Nov. 29, 1995

[51] Int. Cl.$^6$ ............... C08K 5/20; C08L 23/36

[52] U.S. Cl. .............. 525/184; 524/186; 524/206; 524/229; 524/232; 525/178; 525/374

[58] Field of Search ..................... 525/426, 178, 525/184, 421, 374; 524/186, 206, 229, 232, 579, 191, 227, 228, 210

[56] References Cited

U.S. PATENT DOCUMENTS

| | | | |
|---|---|---|---|
| H1583 | 8/1996 | Hwo et al. | 526/348.6 |
| 4,320,209 | 3/1982 | Chatterjee . | |
| 4,322,503 | 3/1982 | Chatterjee . | |
| 4,359,544 | 11/1982 | Hwo et al. | 524/232 |
| 4,546,147 | 10/1985 | Woodbrey et al. | 525/183 |
| 4,645,792 | 2/1987 | Chatterjee | 524/490 |
| 5,128,380 | 7/1992 | Mori | 521/60 |
| 5,491,188 | 2/1996 | Ikeda | 524/229 |
| 5,716,998 | 2/1998 | Munakata | 521/58 |

FOREIGN PATENT DOCUMENTS

| | | |
|---|---|---|
| 0 557 721 A2 | 1/1993 | European Pat. Off. . |
| 0 632 095 A3 | 2/1996 | European Pat. Off. . |

*Primary Examiner*—Fred Zitomer
*Attorney, Agent, or Firm*—Armstrong, Westerman, Hattori, McLeland & Naughton

[57] ABSTRACT

Disclosed are a polybutene-1 resin composition comprising a polybutene-1 resin and a Form-II to Form-I crystal transformation accelerator, and a method of accelerating the Form-II to Form-I crystal transformation comprising molding the polybutene-1 resin composition and allowing the molded product to stand at about 0 to 50° C., the crystal transformation accelerator being an amide compound.

58 Claims, No Drawings

POLYBUTENE-1 RESIN COMPOSITION AND A METHOD OF ACCELERATING THE CRYSTAL TRANSFORMATION THEREOF

FIELD OF THE INVENTION

The present invention relates to a polybutene-1 resin composition, and more particularly to a polybutene-1 resin composition which can give a molded article wherein the crystal transformation peculiar to polybutene-1 resins, especially the phase transformation from Form II (tetragonal crystal modification) to Form I (hexagonal crystal modification), is accelerated or enhanced.

Further, the present invention relates to a polybutene-1 resin composition which can give a molded article wherein specific crystal modifications, particularly Form-II and Form-III, form preferentially from the melt, and then said Form-II transforms into Form-I in a short period, giving a molded article containing Form-I and Form-III crystals.

The present invention also relates to a method for accelerating said form II to form I phase transformation.

The present invention also relates to a method of easily producing a molded article containing crystals of said Form-I and Form-III.

BACKGROUND OF THE INVENTION

Since polybutene-1 resins are excellent in creep resistance, stress cracking resistance, impact resistance, heat resistance, chemical resistance and the like and are flexible, use thereof has been actively developed, along with use of polyethylene resins and polypropylene resins.

The polybutene-1 resin is a useful resin that finds wide range of uses because of the above excellent properties. More specifically, said resin can be molded into various pipes, filaments and films by extrusion molding, into cups and containers by injection molding and into various bottles by blow molding.

However, the polybutene-1 resin forms several crystal modifications or crystal forms and, when the melt of said resin is cooled to the melting point or a lower temperature, unstable form II or the tetragonal crystal modification (hereinafter briefly referred to as "F-II") forms first and then slowly undergoes solid phase transformation into Form-I or the hexagonal crystal modification (hereinafter briefly referred to as "F-I") with a lapse of time. The formation of F-II involves a high degree of supercooling and the rate of crystallization is slow, resulting in retardation of molding cycle. Furthermore, F-II to F-I transformation proceeds at a low rate, and thus it takes a prolonged period of time, usually about a week to 10 days, to complete the transformation.

The crystal modification or crystal form having commercially useful contemplated excellent properties is F-I. On the other hand, there exists a low-melting point crystal modification (Form-III, hereinafter referred to as "F-III") which is presumably rhombic and can be obtained by precipitation from a solution thereof or by casting of a solution thereof.

The crystallization behavior peculiar to the polybutene-1 resin causes various problems in the molding process. For example, when conducting extrusion molding, the molded pipes, sheets and the like must be allowed to stand at room temperature for a prolonged period, partly because the F-II formed immediately after the molding process are flexible and the formed articles, when subjected to an external force during transportation and the like, are likely to be deformed, and partly because it is difficult to obtain molded articles of a prescribed dimension due to the difference in the shrinkage degree among said molded articles if there is a large temperature variation during the transformation. Thus, it is preferable that the molded articles, just after the completion of the molding operation, are allowed to stand in a warehouse which is substantially free of a temperature variation. The period of standing depends on the molding conditions, shape and volume of the molded product and the like, but usually is several days. Thus, the extrusion molding of the polybutene-1 resin is very inefficient.

Further, in the case of injection molding, the molecular orientation is likely to occur which results in anisotropy of the strength, and the molded article may shrink by 1 to 2% after standing at room temperature and thereby become deformed or distorted.

Consequently, in the process of molding the polybutene-1 resin, it is demanded to accelerate the F-II to F-I transformation which is initiated immediately after molding.

Known methods for accelerating the crystallization from a melt of the polybutene-1 resin during the molding process comprise adding stearic acid amide, 1-naphthalene acetamide, benzamide, N,N'-ethylene-bis-stearamide and the like (U.S. Pat. No. 4,320,209, U.S. Pat. No. 4,322,503 and U.S. Pat. No. 4,645,792).

However, the compounds disclosed in these U.S. patents do not produce satisfactory crystallization acceleration effect, and all of these patents disclose only acceleration of the crystallization rate from a melt of the polybutene-1 resin and do not teach the acceleration of the F-II to F-I transformation.

As a method for accelerating the F-II to F-I transformation, it is known to add polypropylene, polyethylene or a sorbitol derivative. However, among these additives, polypropylene and polyethylene must be added in a large amount and are likely to result in poor properties, and the sorbitol derivative tends to exhibit insufficient effects.

Known methods further include a method comprising immersing the molded product in an organic solvent immediately after molding, a method comprising applying an external stress such as compression or stretch to the molded article immediately after molding, and other methods. However, the immersion in an organic solvent is not practically advantageous since it requires special equipment and the solvent after the treatment must be removed by drying and collected. The application of an external stress can not be employed for an article having an intricate shape.

Increase in the formation of F-I fraction immediately after molding is effective for shortening the period to complete the crystal phase transformation, inhibiting the shrinkage of the molded article, preventing the deformation or distortion of the molded article, and other purposes. However, substantially no method therefor has been proposed.

Additionally, an attempt has been made to impart low-temperature heat sealing properties to the polybutene-1 resin, for example, by blending said polybutene-1 resin with a ethylene-propylene random copolymer. However, there arises a problem that the low-temperature heat sealing properties are deteriorated with a lapse of time under the influence of the crystal transformation of the polybutene-1 resin which occurs after the formation of the films.

Therefore, there is a demand for a polybutene-1 resin composition which can give a molded article that shows excellent low-temperature heat sealing properties which would not be deteriorated with a lapse of time.

SUMMARY OF THE INVENTION

An object of the present invention is to provide a novel and useful polybutene-1 resin composition which solves the above-mentioned problems in molding processability, which can give a molded article wherein F-II transforms into F-I at a high rate, and which forms F-I in an increased amount immediately after molding.

Another object of the present invention is to provide a polybutene-1 resin composition which can give a molded article that shows excellent low-temperature heat sealing properties.

Under the circumstances, the present inventors conducted extensive research to solve the above problems, and found that contemplated results can be achieved by adding an amide compound having a specific structure to a polybutene-1 resin. The present invention has been accomplished based on this novel finding.

Thus, the polybutene-1 resin composition of the present invention comprises a polybutene-1 resin and one or more amide compounds selected from the group consisting of polycarboxylic acid-type amide compounds represented by the formula (1), polyamine-type amide compounds represented by the formula (2) and amino acid-type amide compounds represented by the formula (3):

(1) Polycarboxylic acid-type amide compounds represented by the formula

$$R^1—(CONH—R^2)_k \tag{1}$$

wherein k is an integer of 2 to 6, preferably 2 to 4;

$R^1$ is a residue of a saturated or unsaturated aliphatic polycarboxylic acid having 2 to 30, preferably 3 to 16 carbon atoms, a residue of a saturated or unsaturated alicyclic polycarboxylic acid having 6 to 30, preferably 8 to 16 carbon atoms or a residue of an aromatic polycarboxylic acid having 8 to 36, preferably 8 to 22 carbon atoms; and $R^2$ is an alkyl group having 1 to 18, preferably 1 to 8 carbon atoms, an alkenyl group having 2 to 18, preferably 2 to 8 carbon atoms, a cycloalkyl group having 3 to 12, preferably 4 to 8 carbon atoms, a cycloalkenyl group having 3 to 12, preferably 4 to 8 carbon atoms, phenyl group, naphthyl group, anthryl group, a group represented by the formula (a), (b), (c) or (d);

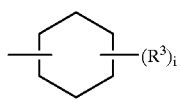
(a)

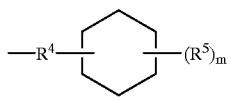
(b)

(c)

or

(d)

(wherein $R^3$, $R^5$, $R^6$ and $R^8$ are the same or different and each represents an alkyl group having 1 to 18, preferably 1 to 8 carbon atoms, an alkenyl group having 2 to 18, preferably 2 to 8 carbon atoms, an alkoxyl group having 1 to 8, preferably 1 to 4 carbon atoms, a cycloalkyl group having 3 to 12, preferably 4 to 8 carbon atoms, phenyl group or a halogen atom;

$R^4$ and $R^7$ are the same or different and each represents a straight- or branched-chain alkylene group having 1 to 4 carbon atoms;

i and n each represents an integer of 1 to 5, preferably 1 to 3; and m and j each represents an integer of 0 to 5, preferably 0 to 3).

(2) Polyamine-type amide compounds represented by the formula

$$R^9—(NHCO—R^{10})_p \tag{2}$$

wherein $R^9$ is a residue of a saturated or unsaturated alicyclic polyamine having 3 to 25, preferably 6 to 13 carbon atoms or a residue of an aromatic polyamine having 6 to 25, preferably 6 to 17 carbon atoms;

$R^{10}$ has the same meaning as $R^2$ in the formula (1);

p is an integer of 2 to 6, preferably 2 or 3.

(3) Amino acid-type amide compounds represented by the formula

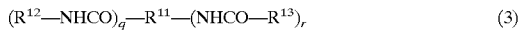
$$(R^{12}—NHCO)_q—R^{11}—(NHCO—R^{13})_r \tag{3}$$

wherein $R^{11}$ is a residue of a saturated aliphatic amino acid having 2 to 25, preferably 2 to 12 carbon atoms, a residue of an unsaturated aliphatic amino acid having 3 to 25, preferably 3 to 12 carbon atoms, a residue of a saturated or unsaturated alicyclic amino acid having 7 to 15, preferably 7 to 9 carbon atoms or a residue of an aromatic amino acid having 7 to 25, preferably 7 to 11 carbon atoms;

$R^{12}$ and $R^{13}$ each have the same meaning as $R^2$ in the formula (1) and are the same or different;

q and r each mean an integer of 1 to 5, preferably 1 or 2, and the sum of q plus r is equal to 2 to 6, preferably 2 to 4.

When the resin composition of the invention is molded, the resulting molded product comprises F-I and F-II immediately after molding, and when the molded product is left to stand at a temperature of about 0 to about 50° C., the F-II quickly transforms into F-I.

Thus, the present invention further provides a method for accelerating the crystal phase transformation of a polybutene-1 resin from Form-II (tetragonal crystal modification) to Form-I (hexagonal crystal modification), the method comprising the steps of a) molding the polybutene-1 resin composition containing said polybutene-1 resin and at least one of the amide compounds represented by the formulas (1), (2) and (3) defined above to obtain a molded product comprising Form-II and b) allowing the molded product to stand at a temperature of about 0 to 50° C., preferably about 10 to 40° C., to thereby cause the transformation of Form-II to Form-I.

The above amide compounds as mentioned above may sometimes be added to polybutene-1 resin for forming Form-III. For example, when sulfonyldibenzoic acid dianilide such as 4,4'-sulfonyldibenzoic acid dianilide is added to a polybutene-1 resin, a considerable amount of Form-III, as well as Form-II, forms from the melt of the polybutene-1 resin composition. Further, the Form-II formed transforms into Form-I in a short period, giving a molded product comprising Form-I and a considerable amount of Form-III.

In this case, the relative proportions of F-I and F-III crystal phases in the obtained molded article may vary depending on the molding conditions, the amount of the amide compound and the like, but the amount of Form-I is usually about 1 to 99% by weight, particularly about 20 to 70% by weight, and the amount of Form-III is about 99 to 1% by weight, preferably about 80 to 30% by weight, based on the total amount of the Form-I and Form-III.

Thus, the present invention provides a process for producing a molded article comprising Form-I and Form-III crystal modifications, the process comprising the steps of
a) molding a polybutene-1 resin composition containing a polybutene-1 resin and sulfonyldibenzoic acid dianilide to obtain a molded product comprising Form-II and Form-III, and
b) allowing the molded product to stand at a temperature of about 0 to 50° C., preferably about 10 to 40° C. to thereby cause transformation of Form-II to Form-I.

Now, it is possible to improve the low-temperature heat sealing properties and to stabilize the low-temperature heat sealing properties after the formation of the films by utilizing the above resin composition of the invention and the molded product prepared therefrom, because the molded product comprises, in addition to the crystals of F-I, crystals of F-III which have a melting point lower than the melting points of F-II and F-I and which undergo substantially no phase transformation at room temperature.

Conventionally, the use of F-III fraction-containing polybutene-1 resin composition or molded product was commercially disadvantageous, since it has been believed that crystallization or precipitation from a solution is the only method for the formation of F-III.

In this specification, F-I and F-II are identified by the X-ray diffraction method described by T. Oda et al in Kobunshi Ronbunshu, 31, 2, 129–134 (1974), and F-III is identified by melting point and infrared spectra which are known to be different from the melting point and infrared spectra of F-I and F-II, as described by Bert H. et al, J. Polym. Sci., Part C, 6, 43–51 (1964).

DETAILED DESCRIPTION OF THE INVENTION

Polybutene-1 Resin

The polybutene-1 resin for use in the present invention is a polymer predominantly comprising butene-1, and specific examples thereof include a butene-1 homopolymer. Also usable are a copolymer comprising ethylene, propylene or like α-olefin (particularly $C_4$–$C_8$ α-olefin) as a minor comonomer, for example, butene-1-ethylene copolymer, butene-1-propylene copolymer and the like. Especially preferable is a butene-1-ethylene copolymer. Such copolymers recommendably comprise at least 60% by weight, preferably at least 70% by weight, more preferably at least 80% by weight of butene-1, based on the total amount of the comonomers. Generally, the butene-1-ethylene copolymer is preferred.

The stereoregularity of the homopolymer and copolymer of butene-1 is recommendably isotactic and syndiotactic, but the contemplated effect of the invention can be produced even when atactic fraction is contained in a small amount.

The catalyst which can be used for the production of such polymers includes not only Ziegler-Natta catalyst which is commonly employed but also a combination catalyst, such as one wherein a transition metal compound (e.g. titanium halides such as titanium trichloride, titanium tetrachloride, etc.) supported on a support composed mainly of magnesium halide, such as magnesium chloride, is combined with an alkylaluminum compound (e.g. triethylaluminum, diethylaluminum chloride, etc.), and Kaminsky catalyst is also usable.

The melt flow rate (hereinafter referred to briefly as "MFR"; measured in accordance with JIS K 7210 (190° C., 2.16 kgf) of the crystalline polybutene-1 resin thus obtained can be appropriately selected according to the molding method to be employed, and is generally about 0.01 to 50 g/10 min. and preferably about 0.03 to 20 g/10 min.

In the present invention, polymer blends are also usable which comprise at least one of the above-mentioned homopolymer and copolymers of butene-1 and a small proportion of a thermoplastic resin and/or an elastomer, such as polyethylene, polypropylene, polyisobutylene, poly-4-methylpentene-1 and the like. These polymer blends usually comprise about 60 to 99% by weight, preferably about 70 to 95% by weight, of at least one member selected from the group consisting of the homopolymer and copolymers of butene-1 and about 1 to 40% by weight, preferably 5 to 30% by weight, of at least one member selected from the group consisting of the above thermoplastic resins and elastomers.

Amide Compounds

Among the amide compounds represented by the formulas (1), (2) and (3), the compound of formula (1) is generally preferable.

In the formula (1), $R^1$ is preferably a residue of a saturated aliphatic polycarboxylic acid having 3 to 16 carbon atoms, a residue of a saturated alicyclic polycarboxylic acid having 7 to 16 carbon atoms or a residue of an aromatic polycarboxylic acid having 8 to 22 carbon atoms.

Also in the formula (1), k is preferably 2 or 3, more preferably 3.

Among the amide compounds of the formula (1) wherein k is 2, particularly preferred are those of the formula (1) wherein $R^1$ is a residue of a saturated aliphatic dicarboxylic acid having 4 to 10 carbon atoms, a residue of a saturated alicyclic dicarboxylic acid having 7 to 10 carbon atoms or a residue of an aromatic dicarboxylic acid having 8 to 17 carbon atoms, and $R^2$ is an alkyl group having 3 to 6 carbon atoms, a cycloalkyl group having 4 to 8 carbon atoms, phenyl group, a residue formed by eliminating amino group from an amine of the formula (4) to be described later (wherein $R^{14}$ is an alkyl group having 1 to 8 carbon atoms or a halogen atom and s is an integer of 1 to 3), a residue formed by eliminating amino group from an amine of the formula (6) to be described later (wherein $R^{17}$ is an alkyl group having 1 to 6 carbon atoms or a halogen atom and u is an integer of 1 to 3), or a residue formed by eliminating amino group from an amine of the formula (7) to be described later (wherein $R^{18}$ is an alkylene group having 1 to 3 carbon atoms, $R^{19}$ is an alkyl group having 1 to 4 carbon atoms or a halogen atom and v is an integer of 0 to 3), or the like.

Among the amide compounds of the formula (1) wherein k is 2, more preferred are those of the formula (1) wherein $R^1$ is a residue formed by removing all the carboxyl groups from a dicarboxylic acid selected from the group consisting of p-phenylenediacetic acid, adipic acid, 2,6-naphthalenedicarboxylic acid, terephthalic acid, 1,4-cyclohexanedicarboxylic acid and 4,4'-sulfonyldibenzoic acid (particularly a residue formed by removing all the carboxyl groups from 1,4-cyclohexanedicarboxylic acid), and $R^2$ is an alkyl group having 3 or 4 carbon atoms, cyclohexyl group, phenyl group, a residue formed by eliminating amino group from an amine of the formula (4) to be described later (wherein $R^{14}$ is an alkyl group having 1 to 4 carbon atoms and s is an integer of 1 to 3), a residue formed by eliminating amino group from an amine of the formula (6) to be described later (wherein $R^{17}$ is an alkyl group having 1 to 4 carbon atoms and u is an integer of 1 to 3), or a residue formed by eliminating amino group from an amine of the formula (7) to be described later (wherein $R^{18}$ is methylene group, $R^{19}$ is an alkyl group having 1 to 4 carbon atoms and v is an integer of 0 to 3), or the like.

Among the amide compounds of the formula (1) wherein k is 3, particularly preferred are those of the formula (1) wherein $R^1$ is a residue of a saturated aliphatic tricarboxylic acid having 6 to 10 carbon atoms, a residue of a saturated alicyclic tricarboxylic acid having 8 to 12 carbon atoms or a residue of an aromatic tricarboxylic acid having 9 to 12 carbon atoms, and $R^2$ is an alkyl group having 3 to 6 carbon atoms, a cycloalkyl group having 4 to 8 carbon atoms, phenyl group, a residue formed by eliminating amino group from an amine of the formula (4) to be described later (wherein $R^{14}$ is an alkyl group having 1 to 8 carbon atoms or a halogen atom and s is an integer of 1 to 3), a residue formed by eliminating amino group from an amine of the formula (6) to be described later (wherein $R^{17}$ is an alkyl group having 1 to 6 carbon atoms or a halogen atom and u is an integer of 1 to 3), or a residue formed by eliminating amino group from an amine of the formula (7) to be described later (wherein $R^{18}$ is an alkylene group having 1 to 3 carbon atoms, $R^{19}$ is an alkyl group having 1 to 4 carbon atoms or a halogen atom and v is an integer of 0 to 3), or the like.

Among the amide compounds of the formula (1) wherein k is 3, more preferred are those of the formula (1) wherein $R^1$ is a residue formed by removing all the carboxyl groups from a tricarboxylic acid selected from the group consisting of trimesic acid, tricarballylic acid and 1,3,5-pentanetricarboxylic acid (particularly a residue formed by removing all the carboxyl groups from trimesic acid), and $R^2$ is an alkyl group having 3 or 4 carbon atoms, cyclohexyl group, phenyl group, a residue formed by eliminating amino group from an amine of the formula (4) to be described later (wherein $R^{14}$ is an alkyl group having 1 to 4 carbon atoms and s is an integer of 1 to 3), a residue formed by eliminating amino group from an amine of the formula (6) to be described later (wherein $R^{17}$ is an alkyl group having 1 to 4 carbon atoms and u is an integer of 1 to 3), or a residue formed by eliminating amino group from an amine of the formula (7) to be described later (wherein $R^{18}$ is methylene group, $R^{19}$ is an alkyl group having 1 to 4 carbon atoms and v is an integer of 0 to 3), or the like.

Preferred compound of the formula (2) are those of the formula (2) wherein p is 2 or 3, $R^9$ is a residue of a saturated alicyclic di- or triamine having 6 to 13 carbon atoms or a residue of an aromatic di- or triamine having 6 to 13 carbon atoms, and $R^{10}$ is an alkyl group having 2 to 9 carbon atoms, a cycloalkyl group having 6 or 7 carbon atoms, phenyl group, a residue formed by eliminating the carboxyl group from an acid of the formula (8) to be described later (wherein $R^{20}$ is an alkyl group having 1 to 6 carbon atoms or a halogen atom and w is an integer of 1 to 3), a residue formed by eliminating the carboxyl group from an acid of the formula (10) to be described later (wherein $R^{23}$ is an alkyl group having 1 to 6 carbon atoms or a halogen atom, and y is an integer of 1 to 3), or a residue formed by eliminating the carboxyl group from an acid of the formula (11) to be described later (wherein $R^{24}$ is an alkylene group having 1 to 3 carbon atoms, $R^{25}$ is an alkyl group having 1 to 4 carbon atoms or a halogen atom, and z is an integer of 0 to 3), or the like.

More preferred compound of the formula (2) are those of the formula (2) wherein p is 2, $R^9$ is a residue formed by removing all the amino groups from a diamine selected from the group consisting of p-phenylenediamine, 1,5-diaminonaphthalene, 4,4'-diaminodiphenylmethane, 4,4'-diaminodiphenylether, 4,4'-diaminodiphenylsulfone, 1,4-diaminocyclohexane and 4,4'-diaminodicyclohexylmethane, and $R^{10}$ is an alkyl group having 2 to 5 carbon atoms, a cyclohexyl group, phenyl group, a residue formed by eliminating the carboxyl group from an acid of the formula (8) to be described later (wherein $R^{20}$ is an alkyl group having 1 to 4 carbon atoms and w is an integer of 1 to 3), a residue formed by eliminating the carboxyl group from an acid of the formula (10) to be described later (wherein $R^{23}$ is an alkyl group having 1 to 4 carbon atoms, and y is an integer of 1 to 3), or a residue formed by eliminating the carboxyl group from an acid of the formula (11) to be described later (wherein $R^{24}$ is methylene group, $R^{25}$ is an alkyl group having 1 to 4 carbon atoms, and z is an integer of 0 to 3), or the like.

Preferred compound of the formula (3) are those of the formula (3) wherein $R^{11}$ is a residue of a saturated aliphatic amino acid having 2 to 8 carbon atoms, a residue of a saturated alicyclic amino acid having 7 to 9 carbon atoms or a residue of an aromatic amino acid having 7 to 11 carbon atoms, and $R^{12}$ and $R^{13}$ each represents an alkyl group having 3 to 6 carbon atoms, a cycloalkyl group having 4 to 8 carbon atoms, phenyl group, a residue formed by eliminating amino group from an amine of the formula (4) to be described later (wherein $R^{14}$ is an alkyl group having 1 to 8 carbon atoms or a halogen atom and s is an integer of 1 to 3), a residue formed by eliminating amino group from an amine of the formula (6) to be described later (wherein $R^{17}$ is an alkyl group having 1 to 6 carbon atoms or a halogen atom and u is an integer of 1 to 3), or a residue formed by eliminating amino group from an amine of the formula (7) to be described later (wherein $R^{18}$ is an alkylene group having 1 to 3 carbon atoms, $R^{19}$ is an alkyl group having 1 to 4 carbon atoms or a halogen atom and v is an integer of 0 to 3), and q is 1 or 2, r is 1 or 2, and the sum of q and r is equal to 2 or 3.

More preferred compound of the formula (3) are those of the formula (3) wherein $R^{11}$ is a residue formed by eliminating all the amino group(s) and all the carboxyl group(s) from an amino acid selected from the group consisting of β-aminopropionic acid, 8-aminocaprylic acid, aspartic acid, glutamic acid, p-aminomethylcyclohexanecarboxylic acid, 4-aminocyclohexanecarboxylic acid, 3,5-diaminocyclohexanecarboxylic acid, p-aminobenzoic acid, 5-amino-1-naphthoic acid, p-aminophenylacetic acid and 3,5-diaminobenzoic acid, $R^{12}$ and $R^{13}$ each represents an alkyl group having 3 or 4 carbon atoms, cyclohexyl group, phenyl group, a residue formed by eliminating amino group from an amine of the formula (4) to be described later (wherein $R^{14}$ is an alkyl group having 1 to 4 carbon atoms and s is an integer of 1 to 3), a residue formed by eliminating amino group from an amine of the formula (6) to be described later (wherein $R^{17}$ is an alkyl group having 1 to 4 carbon atoms and u is an integer of 1 to 3), or a residue formed by eliminating amino group from an amine of the formula (7) to be described later (wherein $R^{18}$ is methylene group, $R^{19}$ is an alkyl group having 1 to 4 carbon atoms and v is an integer of 0 to 3), and q is 1 or 2, r is 1 or 2, and the sum of q and r is equal to 2 or 3.

Processes for the production of amide compounds of the formulas (1), (2) and (3) are described below.

(1) Polycarboxylic Acid-Type Amide Compound of the Formula (1)

The polycarboxylic acid-type amide compound of the formula (1) can be easily prepared by subjecting an aliphatic, alicyclic or aromatic polycarboxylic acid of the formula (1a) or its reactive derivative such as an anhydride, a chloride, an ester or the like and one or more aliphatic, alicyclic or aromatic monoamines of the formula (1b) to amidation reaction:

$$R^1\text{—}(COOH)_k \quad (1a)$$

wherein $R^1$ and k are as defined above,

$$R^2\text{—}NH_2 \quad (1b)$$

wherein $R^2$ is as defined above.

This amidation reaction can be carried out in various conventional manners and the following processes (i) to (iii) may be mentioned as typical examples.

(i) In an inert solvent, said polycarboxylic acid is reacted with said monoamine at about 60 to 200° C. for about 2 to 10 hours. The monoamine is generally used in an amount of about 1 to 10 equivalents per one equivalent of the polycarboxylic acid.

In this process, an activator is preferably used to accelerate the reaction. The activator that can be used includes phosphorus pentaoxide, polyphosphoric acid, phosphorus pentaoxide-methanesulfonic acid, phosphorous ester (e.g. triphenyl phosphite)-pyridine, phosphorous ester-metal salt (e.g. lithium chloride), triphenyl-phosphine-hexachloroethane and so on. Generally, about one equivalent of the activator is used per equivalent of the polycarboxylic acid.

(ii) In an inert solvent, a chloride of said polycarboxylic acid is reacted with said monoamine at about 0 to 100° C. for about 1 to 5 hours. The monoamine is used generally in an amount of 1 to 5 equivalents per one equivalent of the polycarboxylic acid chloride.

(iii) In an inert solvent, an ester, particularly a polyalkyl ($C_{1-3}$) ester, of said polycarboxylic acid is reacted with said monoamine in the presence or absence of a catalyst at about 0 to 250° C. for about 3 to 50 hours. The monoamine is used generally in an amount of about 1 to 20 equivalents per one equivalent of the polycarboxylic acid polyester.

The catalyst may be an acid or basic catalyst that is conventionally used in ester-amide interchange reactions, and is preferably a basic catalyst. Thus, there may be mentioned lithium, sodium, potassium; alkali metal hydrides such as lithium hydride, sodium hydride, potassium hydride, etc.; alkali metal hydroxides such as lithium hydroxide, sodium hydroxide, potassium hydroxide etc.; metal alkoxides such as sodium methoxide, sodium ethoxide, potassium tert-butoxide, etc.; and alkali metal amides such as sodium amide, lithium dipropylamide, etc., among others. The catalyst is used generally in an equimolar amount relative to said polycarboxylic acid.

The inert solvent which can be used for the above processes (i), (ii) and (iii) include, among others, benzene, toluene, xylene, chloroform, chlorobenzene, dichlorobenzene, tetrahydrofuran, dioxane, acetonitrile, N,N-dimethylformamide, N,N-dimethylacetamide and N-methyl-2-pyrrolidone.

The compounds obtained by the above processes (i), (ii) and (iii) are purified by the conventional isolation and purification procedures such as chromatography, reprecipitation, recrystallization, fractional crystallization and so on.

As the polycarboxylic acid of the formula (1a) for use in said processes (i), (ii) and (iii), there may be mentioned the aliphatic, alicyclic or aromatic polycarboxylic acid corresponding to $R^1$. Thus, $R^1$ is preferably a residue formed by elimination of all the carboxyl groups of one of the following aliphatic, alicyclic and aromatic polycarboxylic acids having 2 to 6 carboxyl groups.

The aliphatic polycarboxylic acid includes those having 2 to 30, preferably 3 to 16, more preferably 4 to 10 carbon atoms, such as oxalic acid, malonic acid, diphenylmalonic acid, succinic acid, phenylsuccinic acid, diphenylsuccinic acid, glutaric acid, 3,3-dimethylglutaric acid, adipic acid, pimelic acid, suberic acid, azelaic acid, sebacic acid, 1,12-dodecanedioic acid, 1,14-tetradecanedioic acid, 1,18-octadecanedioic acid, citric acid, methanetricarboxylic acid, tricarballylic acid, propenetricarboxylic acid, pentanetricarboxylic acid, ethanetetracarboxylic acid, propanetetracarboxylic acid, pentanetetracarboxylic acid, butanetetracarboxylic acid (particularly 1,2,3,4-butanetetracarboxylic acid, hereinafter briefly referred to as "BTC"), dodecanetetracarboxylic acid, pentanepentacarboxylic acid, tetradecanehexacarboxylic acid, ethylenediaminetetraacetic acid, nitrirotriacetic acid, ethyleneglycolbis(β-aminoethylether) N,N,N',N'-tetraacetic acid, diethylenetriaminepentaacetic acid, N-hydroxyethylethylenediamine-N,N',N'-triacetic acid, 1,3-diaminopropane-2-ol-N,N,N',N'-tetraacetic acid, 1,2-diaminopropane-N,N,N',N'-tetraacetic acid, triethylenetetraminehexaacetic acid, nitrirotripropionic acid, 1,6-hexanediaminetetraacetic acid, N-(2-carboxyethyl) iminodiacetic acid and the like.

The alicyclic polycarboxylic acid includes those having 6 to 30, preferably 8 to 16 carbon atoms, such as 1,2-cyclohexane dicarboxylic acid, 1,4-cyclohexanedicarboxylic acid, 1,4-cyclohexanediacetic acid, cyclohexanetricarboxylic acid, cyclobutanetetracarboxylic acid, cyclopentanetetracarboxylic acid, cyclohexanetetracarboxylic acid, tetrahydrofurantetracarboxylic acid, 5-(succinic acid)-3-methyl-3-cylohexene-1,2-dicarboxylic acid (hereinafter briefly referred to as "SMCD"), bicyclo[2,2,2]octa-7-ene-2,3,5,6-tetracarboxylic acid, cyclohexanehexacarboxylic acid, 5,6,9,10-tetracarboxytricyclo[6.2.2.0$^{2,7}$]dodeca-2,11-diene which may have a lower alkyl group as a substituent (such as a methyl group at the 3-, 8- 11- or 12-position), 1,2-cyclohexanediaminetetraacetic acid, 2,3,5-tricarboxycyclopentylacetic acid, 6-methyl-4-cyclohexene-1,2,3-tricarboxylic acid, 3,5,6-tricarboxynorbornene-2-acetic acid, thiobis(norbornene-2,3-dicarboxylic acid), bicyclo[4.2.0]octane-3,4,7,8-tetracarboxylic acid, 1,1'-bicyclopropane-2,2',3,3'-tetracarboxylic acid, 1,2-bis(2,3-dimethyl-2,3-dicarboxycyclobutyl)ethane, pyrazine-2,3,5,6-tetracarboxylic acid, tricyclo[4.2.2.0$^{2,5}$]decane- 9-ene-3,4,7,8-tetracarboxylic acid, 3,4-dicarboxy-1,2,3,4-tetrahydro-1-naphthalenesuccinic acid (hereinafter briefly referred to as "TDA") which may have a lower alkyl group as a substituent (such as a methyl group at the 1-, 5-, 6- or 7-position), 2,3,4,5,6,7,12,13-octahydrophenanthrene-3,4,5,6-tetracarboxylic acid and the like.

The aromatic polycarboxylic acid includes those having 8 to 36, preferably 8 to 22, more preferably 8 to 17 carbon atoms, such as p-phenylenediacetic acid, p-phenylenediethanoic acid, phthalic acid, 4-tert-butylphthalic acid, isophthalic acid, 5-tert-butylisophthalic acid, terephthalic acid, 1,8-naphthalic acid, 1,4-naphthalenedicarboxylic acid, 2,6-naphthalenedicarboxylic acid, 2,7-naphthalenedicarboxylic acid, diphenic acid, 3,3'-biphenyldicarboxylic acid, 4,4'-biphenyldicarboxylic acid, 4,4'-binaphthyldicarboxylic acid, bis(3-carboxyphenyl) methane, bis(4-carboxyphenyl)methane, 2,2-bis(3-carboxyphenyl)propane, 2,2-bis(4-carboxyphenyl)propane, 3,3'-sulfonyldibenzoic acid, 4,4,-sulfonyldibenzoic acid, 3,3'-oxydibenzoic acid, 4,4'-oxydibenzoic acid, 3,3'-carbonyldibenzoic acid, 4,4'-carbonyldibenzoic acid, 3,3'-thiodibenzoic acid, 4,4'-thiodibenzoic acid, 4,4'-(p-phenylenedioxy)dibenzoic acid, 4,4'-isophthaloyldibenzoic acid, 4,4'-terephthaloyldibenzoic acid, dithiosalicylic acid, benzenetricarboxylic acid such as trimesic acid, benzenetetracarboxylic acid, benzophenonetetracarboxylic acid, biphenyltetracarboxylic acid, diphenylethertetracarboxylic acid, diphenylsulfonetetracarboxylic acid (hereinafter referred to as "DSTC"), diphenylmethanetetracarboxylic acid, perylenetetracarboxylic acid, naphthalenetetracarboxylic acid, 4,4'-dinaphthalic acid, benzidine-3,3'-dicarboxyl-N,N'-tetraacetic acid, diphenylpropanetetracarboxylic acid, anthracenetetracarboxylic acid, phthalocyaninetetracarboxylic acid, ethyleneglycol-trimellitic acid diester, benzenehexacarboxylic acid, glycerine-trimellitic acid triester and so on.

On the other hand, the monoamine of the formula (1b) to be used in processes (i), (ii) and (iii) is the aliphatic, alicyclic or aromatic monoamine corresponding to $R^2$.

The aliphatic monoamine includes an alkylamine having 1 to 18, preferably 1 to 8, more preferably 3 to 6 carbon atoms and an alkenylamine having 2 to 18, preferably 2 to 8 carbon atoms, such as methylamine, ethylamine, propylamine, isopropylamine, n-butylamine, isobutylamine, secondary butylamine, tertiary butylamine, n-amylamine, tertiary amylamine, hexylamine, heptylamine, n-octylamine, 2-ethylhexylamine, tertiary octylamine, nonylamine, decylamine, undecylamine, dodecylamine, tridecylamine, tetradecylamine, pentadecylamine, hexadecylamine, pentadecylamine, octadecylamine, octadecenylamine, allylamine and the like.

The alicyclic monoamine includes cycloalkylamines and cycloalkenylamines each having 3 to 12, preferably 4 to 8, more preferably 5 or 6 carbon atoms, such as cyclopropylamine, cyclobutylamine, cyclopentylamine, cyclohexylamine, cycloheptylamine, cyclooctylamine, cyclododecylamine and the like, and compounds represented by the formulas (4) and (5).

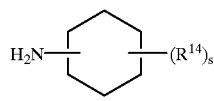

(4)

wherein $R^{14}$ is an alkyl group having 1 to 18, preferably 1 to 8, more preferably 1 to 4 carbon atoms, an alkenyl group having 2 to 18, preferably 2 to 8, more preferably 2 to 4 carbon atoms, an alkoxyl group having 1 to 8, preferably 1 to 4 carbon atoms, a cycloalkyl group having 3 to 12, preferably 4 to 8, more preferably 5 or 6 carbon atoms, phenyl group or a halogen atom such as chlorine, bromine and the like, and s is an integer of 1 to 5, preferably 1 to 3.

The alicyclic monoamine of the formula (4) includes monosubstituted alicyclic monoamines such as methylcyclohexylamine, ethylcyclohexylamine, propylcyclohexylamine, isopropylcyclohexylamine, tert-butylcyclohexylamine, n-butylcyclohexylamine, isobutylcyclohexylamine, sec-butylcyclohexylamine, n-amylcyclohexylamine, isoamylcyclohexylamine, sec-amylcyclohexylamine, tert-amylcyclohexylamine, hexylcyclohexylamine, heptylcyclohexylamine, octylcyclohexylamine, nonylcyclohexylamine, decylcyclohexylamine, undecylcyclohexylamine, dodecylcyclohexylamine, cyclohexylcyclohexylamine, phenylcyclohexylamine and the like; disubstituted alicyclic monoamines such as dimethylcyclohexylamine, diethylcyclohexylamine, dipropylcyclohexylamine, diisopropylcyclohexylamine, di-n-butylcyclohexylamine, di-sec-butylcyclohexylamine, di-tert-butylcyclohexylamine, di-n-amylcyclohexylamine, di-tert-amylcyclohexylamine, dihexylcyclohexylamine and the like; trisubstituted alicyclic monoamines such as trimethylcyclohexylamine, triethylcyclohexylamine, tripropylcyclohexylamine, triisopropylcyclohexylamine, tri-n-butylcyclohexylamine, tri-sec-butylcyclohexylamine, tri-tert-butylcyclohexylamine and the like; alkoxy-substituted aliphatic monoamines such as methoxycyclohexylamine, ethoxycyclohexylamine, dimethoxycyclohexylamine, diethoxycyclohexylamine, di-n-butoxycyclohexylamine, di-sec-butoxycyclohexylamine, di-tert-butoxycyclohexylamine, trimethoxycyclohexylamine, tri-n-butoxycyclohexylamine and the like; halogen-substituted alicyclic monoamines such as chlorocyclohexylamine, dichlorocyclohexylamine, methylchlorocyclohexylamine, trichlorocyclohexylamine, bromocyclohexylamine, dibromocyclohexylamine, tribromocyclohexylamine and the like; etc.

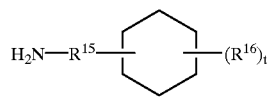

(5)

wherein $R^{15}$ is a straight- or branched-chain alkylene group having 1 to 4 carbon atoms, $R^{16}$ has the same meaning as $R^{14}$ in the formula (4), t is an integer of 0 to 5, preferably 0 to 3.

The alicyclic monoamine of the formula (5) includes cyclohexylmethylamine, methylcyclohexylmethylamine, dimethylcyclohexylmethylamine, trimethylcyclohexylmethylamine, methoxycyclohexylmethylamine, ethoxycyclohexylmethylamine, dimethoxycyclohexylmethylamine, chlorocyclohexylmethylamine, dichlorocyclohexylmethylamine, α-cyclohexylethylamine, β-cyclohexylethylamine, methoxycyclohexylethylamine, dimethoxycyclohexylethylamine, chlorocyclohexylethylamine, dichlorocyclohexylethylamine, α-cyclohexylpropylamine, β-cyclohexylpropylamine, γ-cyclohexylpropylamine, methylcyclohexylpropylamine and the like.

The aromatic monoamine includes aniline, 1-naphthylamine, 2-naphtylamine, 1-aminoanthracene, 2-aminoanthracene and the like, and compounds represented by the formulas (6) and (7).

(6)

wherein $R^{17}$ is an alkyl group having 1 to 18, preferably 1 to 8, more preferably 1 to 4 carbon atoms, an alkenyl group having 2 to 18, preferably 2 to 8, more preferably 2 to 4 carbon atoms, an alkoxyl group having 1 to 8, preferably 1 to 4 carbon atoms, a cycloalkyl group having 3 to 12, preferably 4 to 8, more preferably 5 or 6 carbon atoms, phenyl group or a halogen atom such as chlorine, bromine and the like, and u is an integer of 1 to 5, preferably 1 to 3.

The aromatic monoamine of the formula (6) includes toluidine, ethylaniline, propylaniline, cumidine, tert-butylaniline, n-butylaniline, isobutylaniline, sec-butylaniline, n-amylaniline, isoamylaniline, sec-amylaniline, tert-amylaniline, hexylaniline, heptylaniline, octylaniline, nonylaniline, decylaniline, undecylaniline, dodecylaniline, cyclohexylaniline, aminodiphenyl, aminostyrene, dimethylaniline, diethyaniline, dipropylaniline, diisopropylaniline, di-n-butylaniline, di-sec-butylaniline, di-tert-butylaniline, trimethylaniline, triethylaniline, tripropylaniline, tri-tert-butylaniline, anisidine, ethoxyaniline, dimethoxyaniline, diethoxyaniline, trimethoxyaniline, tri-n-butoxyaniline, chloroaniline, dichloroaniline, trichloroaniline, bromoaniline, dibromoaniline, tribromoaniline and the like.

(7)

wherein $R^{18}$ has the same meaning as $R^{15}$ in the formula (5), $R^{19}$ has the same meaning as $R^{17}$ in the formula (6), v is an integer of 0 to 5, preferably 0 to 3.

The aromatic monoamine of the formula (7) includes benzylamine, methylbenzylamine, dimethylbenzylamine, trimethylbenzylamine, methoxybenzylamine, ethoxybenzylamine, dimethoxybenzylamine, chlorobenzylamine, dichlorobenzylamine, α-phenylethylamine, β-phenylethylamine, methoxyphenylethylamine, dimethoxyphenylethylamine, chlorophenylethylamine, dichlorophenylethylamine, α-phenylpropylamine, β-phenylpropylamine, γ-phenylpropylamine, methylphenylpropylamine and the like.

Among the amide compounds of the formula (1), wherein $R^1$ is a residue formed by elimination of all the carboxyl groups of a polycarboxylic acid selected from the group consisting of p-phenylenediacetic acid, adipic acid, 2,6-naphthalenedicarboxylic acid, terephthalic acid, 1,4-cyclohexanedicarboxylic acid, trimesic acid, tricarballylic acid, DSTC (diphenylsulfonetetracarboxylic acid), TDA (3,4-dicarboxy-1,2,3,4-tetrahydro-1-naphthalenesuccinic acid), BTC (1,2,3,4-butanetetracarboxylic acid) and 4,4'-sulfonyldibenzoic acid.

Particularly preferred are amide compounds of the formula (1) wherein $R^1$ is a residue formed by elimination of all the carboxyl groups of trimesic acid.

Among them, recommended are the compounds of the formula (1) wherein $R^1$ represents an alkyl group having 3 to 6 carbon atoms, a cycloalkyl group having 4 to 8 carbon atoms, phenyl group, a residue formed by eliminating amino group from an amine of the formula (4) wherein $R^{14}$ is an alkyl group having 1 to 8 carbon atoms or a halogen atom and s is an integer of 1 to 3, a residue formed by eliminating amino group from an amine of the formula (6) wherein $R^{17}$ is an alkyl group having 1 to 6 carbon atoms or a halogen atom and u is an integer of 1 to 3, or a residue formed by eliminating amino group from an amine of the formula (7) wherein $R^{18}$ is an alkylene group having 1 to 3 carbon atoms, $R^{19}$ is an alkyl group having 1 to 4 carbon atoms or a halogen atom and v is an integer of 0 to 3, or the like.

More preferred are the compounds of the formula (1) wherein $R^2$ represents an alkyl group having 3 or 4 carbon atoms, cyclohexyl group, phenyl group, a residue formed by eliminating amino group from an amine of the formula (4) wherein $R^{14}$ is an alkyl group having 1 to 4 carbon atoms and s is an integer of 1 to 3, a residue formed by eliminating amino group from an amine of the formula (6) wherein $R^{17}$ is an alkyl group having 1 to 4 carbon atoms and u is an integer of 1 to 3, or a residue formed by eliminating amino group from an amine of the formula (7) wherein $R^{18}$ is methylene group, $R^{19}$ is an alkyl group having 1 to 4 carbon atoms and v is an integer of 0 to 3, or the like.

Among the amide compounds of the formula (1), especially recommended are p-phenylenediacetic acid dianilide, p-phenylenediacetic acid dicyclohexylamide, 1,4-cyclohexanedicarboxylic acid dicyclohexylamide, terephthalic acid dianilide, terephthalic acid dibenzylamide, 1,4-cyclohexanedicarboxylic acid dianilide, adipic acid bis(2,6-dimethylanilide), tricarballylic acid tris(2-methylcyclohexylamide), butanetetracarboxylic acid tetracyclohexylamide, butanetetracarboxylic acid tetrabenzylamide, trimesic acid tris(t-butylamide), trimesic acid tricyclohexylamide, trimesic acid tris(2-methylcyclohexylamide), trimesic acid tribenzylamide, 4,4'-sulfonyldibenzoic acid dianilide and the like.

Particularly preferred among them are trimesic acid tris (t-butylamide), trimesic acid tricyclohexylamide, trimesic acid tris(2-methylcyclohexylamide), trimesic acid tribenzylamide and the like.

(2) Polyamine-Type Amide Compound of the Formula (2)

The polyamine-type amide compound of the formula (2) can be easily prepared by subjecting an alicyclic or aromatic polyamine of the formula (2a) and one or more aliphatic, alicyclic or aromatic monocarboxylic acids of the formula (2b) or the reactive derivatives thereof, such as chlorides or esters thereof, to amidation reaction by a conventional method:

wherein $R^9$ and p are as defined above,

wherein $R^{10}$ is as defined above.

The amidation reaction is carried out in various conventional manners and the following processes may be mentioned as typical examples.

(i') In an inert solvent, said polyamine is reacted with said monocarboxylic acid at a temperature of about 60 to 200° C. for about 2 to 10 hours. The monocarboxylic acid is generally used in an amount of about 1 to 10 equivalents per one equivalent of the polyamine.

In this process, the activators exemplified in the above process (i) are preferably used to accelerate the reaction. Generally, about one equivalent of the activator is used per one equivalent of the polyamine.

(ii') In an inert solvent, said polyamine is reacted with a chloride of said monocarboxylic acid at a temperature of about 0 to 100° C. for about 1 to 5 hours. The monocarboxylic acid chloride is used generally in an amount of 1 to 3 equivalents per one equivalent of the polyamine.

(iii') In an inert solvent, said polyamine is reacted with an ester (especially an alkyl ($C_{1-3}$) ester) of said monocarboxylic acid in the presence or absence of a catalyst at about 0 to 250° C. for about 3 to 50 hours. The monocarboxylic acid ester is used generally in an amount of about 1 to 20 equivalents per one equivalent of the polyamine. The catalyst may be an acid or basic catalyst exemplified in the above process (iii) which is conventionally used in ester-amide interchange reactions, and is preferably a basic catalyst.

The inert solvents which can be used for the above processes (i'), (ii') and (iii') are the same as those exemplified in the above processes (i), (ii) and (iii) for preparing the compound of the formula (1).

The compounds obtained by the above processes can each be purified by the conventional isolation and purification procedures such as chromatography, reprecipitation, recrystallization, fractional crystallization, and so on.

The polyamine of the formula (2a) for use in the processes (i'), (ii') and (iii') is an alicyclic or aromatic polyamine corresponding to $R^9$. Thus, $R^9$ is preferably a residue formed by elimination of all the amino groups of one of the following alicyclic or aromatic polyamines having 2 to 6 amino groups.

The alicyclic polyamine includes those having 3 to 25, preferably 6 to 13 carbon atoms, such as 1,2-diaminocyclohexane, 1,4-diaminocyclohexane, 4,4'-diaminodicyclohexyl, 4,4'-diamino-3,3'-dimethyldicyclohexyl, 4,4'-diaminodicyclohexylmethane, 4,4'-diamino-3,3'-dimethyldicyclohexylmethane, 1,3-bis(aminomethyl)cyclohexane, 1,4-bis(aminomethyl)cyclohexane, isophoronediamine, menthenediamine, melamine, 1,3,5-triaminocyclohexane, 1,2,4-triaminocyclohexane, 1,2,4,5-tetraaminocyclohexane and the like.

The aromatic polyamine includes those having 6 to 25, preferably 6 to 17, more preferably 6 to 13 carbon atoms, such as o-phenylenediamine, m-phenylenediamine, p-phenylenediamine, 2,3-diaminotoluene, 2,4-diaminotoluene, 2,6-diaminotoluene, 3,4-diaminotoluene, 4,6-dimethyl-m-phenylenediamine, 2,5-dimethyl-p-phenylenediamine, 4,5-dimethyl-o-phenylenediamine, 2,4-diaminomesitylene, 2,3-diaminopyridine, 2,6-diaminopyridine, 3,4-diaminopyridine, 1,5-diaminonaphthalene, 1,8-diaminonaphthalene, 2,3-diaminonaphthalene, 2,7-diaminonaphthalene, 9,10-diaminophenanthrene, 3,3',5,5'-tetramethylbenzidine, 3,3'-dimethyl-4,4'-diaminobiphenyl, 3,3'-dimethoxy-4,4'-diaminobiphenyl, 4,4'-diaminodiphenylmethane, 3,3'-diaminodiphenylmethane, 3,4'-diaminodiphenylmethane, 4,4'-methylenedi-o-toluidine, 4,4'-methylenedi-2,6-xylidine, 4,4'-methylenedi-2,6-diethylaniline, 4,4'-diamino-1,2-diphenylethane, 4,4'-diamino-2,2'-dimethylbibenzyl, 4,4'-diaminostilbene, 3,4'-diamino-2,2-diphenylpropane, 4,4'-diamino-2,2-diphenylpropane, 4,4'-diaminodiphenylether, 3,4'-diaminodiphenylether, 4,4'-thiodianiline, 2,2'-dithiodianiline, 4,4'-dithiodianiline, 3,3'-diaminodiphenylsulfone, 4,4'-diaminodiphenylsulfone, 3,3'-diaminobenzophenone, 4,4'-diaminobenzophenone, 4,4'-diaminobenzanilide, o-tolidinesulfone, 2,7-diaminofluorene, 3,7-diamino-2-methoxyfluorene, bis-p-aminophenylaniline, 1,3-bis(4-aminophenylpropyl)benzene, 1,4-bis(4-aminophenylpropyl)benzene, 1,3-bis(4-aminophenoxy)benzene, 1,4-bis(4-aminophenoxy)benzene, 4,4'-bis(4-aminophenoxy)biphenyl, bis[4-(4-aminophenoxy)phenyl]ether, bis[4-(4-aminophenoxy)phenyl]sulfone, 9,9-bis(4-aminophenyl)fluorene-1,2,4,5-tetraaminobenzene, 1,3,5-triaminobenzene, 1,2,4-triaminobenzene, Para Rosaniline, 2,4,6-triaminophenol, 3,3'-diaminobenzidine, tris(4-aminophenyl)methane, 2,4,6-triaminopyrimidine, and the like.

On the other hand, the aliphatic monocarboxylic acid of the formula (2b) includes a saturated aliphatic carboxylic acid having 2 to 19, preferably 2 to 9, more preferably 2 to 5 carbon atoms and an unsaturated aliphatic carboxylic acid having 3 to 19, preferably 3 to 9 carbon atoms, such as acetic acid, propionic acid, butyric acid, valeric acid, caproic acid, enanthic acid., caprylic acid, pelargonic acid, capric acid, undecylic acid, lauric acid, tridecylic acid, myristic acid, pentadecylic acid, palmitic acid, heptadecylic acid, stearic acid, nonadecanoic acid, acrylic acid, crotonic acid, oleic acid, elaidic acid, sorbic acid, linoleic acid, linolenic acid, pivalic acid, and the like.

The alicyclic monocarboxylic acid of the formula (2b) includes a saturated or unsaturated alicyclic monocarboxylic acid having 4 to 13, preferably 5 to 9, more preferably 6 or 7 carbon atoms, such as cyclopropanecarboxylic acid, cyclobutanecarboxylic acid, cyclopentanecarboxylic acid, cyclopentenecarboxylic acid, cyclohexanecarboxylic acid, cyclohexenecarboxylic acid, cycloheptanecarboxylic acid, methylcyclopentanecarboxylic acid, phenylcyclopentanecarboxylic acid, butylcyclohexenecarboxylic acid, methylcycloheptanecarboxylic acid and the like, and compounds represented by the formulas (8) and (9).

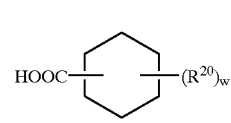

(8)

wherein $R^{20}$ has the same meaning as $R^{14}$ in the formula (4) and w is an integer of 1 to 5, preferably 1 to 3.

The alicyclic monocarboxylic acid of the formula (8) includes, for example, methylcyclohexanecarboxylic acid, ethylcyclohexanecarboxylic acid, propylcyclohexanecarboxylic acid, butylcyclohexanecarboxylic acid, pentylcyclohexanecarboxylic acid, hexylcyclohexanecarboxylic acid, phenylcyclohexanecarboxylic acid, chlorocyclohexanecarboxylic acid, bromocyclohexanecarboxylic acid, dimethylcyclohexanecarboxylic acid, di-tert-butylcyclohexanecarboxylic acid, methoxycyclohexanecarboxylic acid, ethoxycyclohexanecarboxylic acid, dimethoxycyclohexanecarboxylic acid, diethoxycyclohexanecarboxylic acid, dichlorocyclohexanecarboxylic acid, trimethylcyclohexanecarboxylic acid, trimethoxycyclohexanecarboxylic acid, triethoxycyclohexanecarboxylic acid and the like.

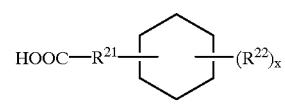

(9)

wherein $R^{21}$ has the same meaning as $R^{15}$ in the formula (5), $R^{22}$ has the same meaning as $R^{20}$ in the formula (8), and x is an integer of 0 to 5, preferably 0 to 3.

The alicyclic monocarboxylic acid of the formula (9) includes, for example, cyclohexylacetic acid, methylcyclohexylacetic acid, methoxycyclohexylacetic acid, cyclohexylpropionic acid, cyclohexylbutyric acid and the like.

The aromatic monocarboxylic acid includes benzoic acid, 1-naphthoic acid, 9-carboxyanthracene, and compounds represented by the formulas (10) and (11).

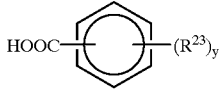
(10)

wherein $R^{23}$ has the same meaning as $R^{17}$ in the formula (6) and y is an integer of 1 to 5, preferably 1 to 3.

The aromatic monocarboxylic acid of the formula (10) includes, for example, methylbenzoic acid, ethylbenzoic acid, propylbenzoic acid, butylbenzoic acid, p-tert-butylbenzoic acid, pentylbenzoic acid, hexylbenzoic acid, phenylbenzoic acid, cyclohexylbenzoic acid, chlorobenzoic acid, bromobenzoic acid, methoxybenzoic acid, ethoxybenzoic acid, dimethylbenzoic acid, di-tert-butylbenzoic acid, dimethoxybenzoic acid, diethoxybenzoic acid, dichlorobenzoic acid, trimethylbenzoic acid, trimethoxybenzoic acid, triethoxybenzoic acid and the like.

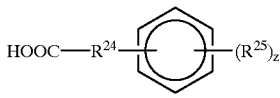
(11)

wherein $R^{24}$ has the same meaning as $R^{21}$ in the formula (9), $R^{25}$ has the same meaning as $R^{23}$ in the formula (10) and z is an integer of 0 to 5, preferably 0 to 3.

The aromatic monocarboxylic acid of the formula (11) include, for example, phenylacetic acid, methylphenylacetic acid, methoxyphenylacetic acid, phenylpropionic acid, phenylbutyric acid and the like.

Among the amide compounds represented by the formula (2), recommended are compounds of the formula (2) wherein $R^9$ is a residue formed by elimination of all the amino groups from p-phenylenediamine, 1,5-diaminonaphthalene, 4,4'-diaminodiphenylmethane, 4,4'-diaminodiphenylether, 4,4'-diaminodiphenylsulfone, 1,4-diaminocyclohexane or 4,4'-diaminodicyclohexylmethane, or alternatively from tris(4-aminophenyl)methane, 3,3'-diaminobenzidine, melamine, or the like.

Among them, preferred are the compounds of the formula (2) wherein $R^{10}$ is an alkyl group having 2 to 9 carbon atoms, a cycloalkyl group having 6 or 7 carbon atoms, phenyl group, a residue formed by eliminating the carboxyl group from an acid of the formula (8) wherein $R^{20}$ is an alkyl group having 1 to 6 carbon atoms or a halogen atom and w is an integer of 1 to 3, a residue formed by eliminating the carboxyl group from an acid of the formula (10) wherein $R^{23}$ is an alkyl group having 1 to 6 carbon atoms or a halogen atom, and y is an integer of 1 to 3, or a residue formed by eliminating the carboxyl group from an acid of the formula (11) wherein $R^{24}$ is an alkylene group having 1 to 3 carbon atoms, $R^{25}$ is an alkyl group having 1 to 4 carbon atoms or a halogen atom, and z is an integer of 0 to 3, or the like.

Among them, more preferred are the compounds of the formula (2) wherein $R^{10}$ is an alkyl group having 2 to 5 carbon atoms, a cyclohexyl group, phenyl group, a residue formed by eliminating the carboxyl group from an acid of the formula (8) wherein $R^{20}$ is an alkyl group having 1 to 4 carbon atoms and w is an integer of 1 to 3, a residue formed by eliminating the carboxyl group from an acid of the formula (10) wherein $R^{23}$ is an alkyl group having 1 to 4 carbon atoms, and y is an integer of 1 to 3, or a residue formed by eliminating the carboxyl group from an acid of the formula (11) wherein $R^{24}$ is methylene group, $R^{25}$ is an alkyl group having 1 to 4 carbon atoms, and z is an integer of 0 to 3, or the like.

As the compounds of the formula (2), N,N'-dibenzoyl-1,4-diaminocyclohexane, N,N'-dicyclohexanecarbonyl-p-phenylenediamine, N,N'-dibenzoyl-1,5-diaminonaphthalene, N,N'-bis(p-methylbenzoyl)-1,4-diaminocyclohexane and the like are most recommendable.

(3) Amino Acid-Type Amide Compound of the Formula (3)

The amino acid-type amide compound of the formula (3) can be easily prepared by subjecting an aliphatic, alicyclic or aromatic amino acid of the formula (3a), one or more aliphatic, alicyclic or aromatic monoamine of the formula (3b), and chloride or chlorides of one or more aliphatic, alicyclic or aromatic monocarboxylic acid of the formula (3c) to amidation reaction:

(3a)

wherein $R^{11}$, q, r and the sum of q and r are as defined above,

(3b)

wherein $R^{12}$ is as defined above, and

(3c)

wherein $R^{13}$ is as defined above.

The amidation reaction can be carried out, for example, by reacting said amino acid of the formula (3a) with about 1 equivalent, relative to the amino groups of said amino acid, of said monocarboxylic acid chloride in an inert solvent at about 0 to 100° C. for about 1 to 5 hours, then adding 1 to 5 equivalents, relative to the carboxyl groups in the reaction product, of said monoamine and conducting the reaction, preferably in the presence of the activator mentioned with respect to process (i), at about 60 to 200° C. for about 2 to 10 hours. The inert solvent may be any of the solvents mentioned hereinbefore in connection with process (i) for the production of said compound of the formula (1).

The compound obtained by the above process is purified by the conventional isolation and purification procedures such as chromatography, reprecipitation, recrystallization, fractional crystallization and so on.

The amino acid of the formula (3a) is an aliphatic, alicyclic or aromatic amino acid corresponding to $R^{11}$. Thus, $R^{11}$ is a residue formed by elimination of all the amino groups and all the carboxyl groups of one of the following aliphatic, alicyclic and aromatic amino acids wherein the number of the amino groups and carboxyl groups is 2 to 6 in total.

The aliphatic amino acid includes those having 2 to 6, preferably 2 to 4 carboxyl groups and amino groups in total and having 2 to 25, preferably 2 to 12, more preferably 2 to 5 carbon atom, such as aminoacetic acid, α-aminopropionic acid, β-aminopropionic acid, α-aminoacrylic acid, α-aminobutyric acid, β-aminobutyric acid, γ-aminobutyric acid, α-amino-α-methylbutyric acid, γ-amino-α-methylbutyric acid, α-aminoisobutyric acid, β-aminoisobutyric acid, α-amino-n-valeric acid, δ-amino-n-valeric acid, β-aminocrotonic acid, α-amino-β-methylvaleric acid, α-aminoisovaleric acid, 2-amino-4-pentenoic acid, α-amino-n-caproic acid, 6-aminocaproic acid, α-aminoisocaproic acid, 7-aminoheptanoic acid, α-amino-n-caprylic acid, 8-aminocaprylic acid, 9-aminononanoic acid, 11-aminoundecanoic acid, 12-aminododecanoic acid, 2-aminoadipic acid, arginine, asparagine, aspartic acid, cystine, glutamic acid, glutamine, ornithine, creatine, S-(carboxymethyl)cystine, aminomalonic acid, and the like.

The alicyclic amino acid include those having 2 to 6, preferably 2 to 4 carboxyl groups and amino groups in total and having 7 to 15, preferably 7 to 9 carbon atoms, such as 1-aminocyclohexanecarboxylic acid, 2-aminocyclohexanecarboxylic acid, 3-aminocyclohexanecarboxylic acid, 4-aminocyclohexanecarboxylic acid, p-aminomethylcyclohexanecarboxylic acid, 2-amino-2-norbornanecarboxylic acid, 3,5-diaminocyclohexanecarboxylic acid, 1-amino-1,3-cyclohexanedicarboxylic acid and the like.

The aromatic amino acid includes those having 2 to 6, preferably 2 to 4 carboxyl groups and amino groups in total and having 7 to 25, preferably 7 to 15, more preferably 7 to 11 carbon atoms, such as α-aminophenylacetic acid, α-amino-β-phenylpropionic acid, 2-amino-2-phenylpropionic acid, 3-amino-3-phenylpropionic acid, α-amino cinnamic acid, 2-amino-4-phenylbutyric acid, 4-amino-3-phenylbutyric acid, anthranilic acid, m-aminobenzoic acid, p-aminobenzoic acid, 2-amino-4-methylbenzoic acid, 2-amino-6-methylbenzoic acid, 3-amino-4-methylbenzoic acid, 2-amino-3-methylbenzoic acid, 2-amino-5-methylbenzoic acid, 4-amino-2-methylbenzoic acid, 4-amino-3-methylbenzoic acid, 2-amino-3-methoxybenzoic acid, 3-amino-4-methoxybenzoic acid, 4-amino-2-methoxybenzoic acid, 4-amino-3-methoxybenzoic acid, 2-amino-4,5-dimethoxybenzoic acid, o-aminophenylacetic acid, m-aminophenylacetic acid, p-aminophenylacetic acid, 4-(4-aminophenyl)butyric acid, 4-aminomethylbenzoic acid, 4-aminomethylphenylacetic acid, o-aminocinnamic acid, m-aminocinnamic acid, p-aminocinnamic acid, p-aminohippuric acid, 2-amino-1-naphthoic acid, 3-amino-1-naphthoic acid, 4-amino-1-naphthoic acid, 5-amino-1-naphthoic acid, 6-amino-1-naphthoic acid, 7-amino-1-naphthoic acid, 8-amino- 1-naphthoic acid, 1-amino-2-naphthoic acid, 3-amino-2-naphthoic acid, 4-amino-2-naphthoic acid, 5-amino-2-naphthoic acid, 6-amino-2-naphthoic acid, 7-amino-2-naphthoic acid, 8-amino-2-naphthoic acid, 3,5-diaminobenzoic acid, 4,4'-diamino-3,3'-dicarboxydiphenylmethane and the like.

The monoamines for use as a starting material for the amide compounds of the formula (3) are the same as the monoamines for use as a starting material for the amide compounds of the formula (1). The monocarboxylic acids for use as another starting material are the same as the monocarboxylic acids for use as a starting material for the amide compounds of the formula (2).

Among the amide compound of the formula (3), especially recommended are compounds wherein $R^{11}$ is a residue formed by elimination of all the amino groups and all the carboxyl groups of β-aminopropionic acid, 8-aminocaprylic acid, aspartic acid, glutamic acid, p-aminomethylcyclohexanecarboxylic acid, 4-aminocyclohexanecarboxylic acid, 3,5-diaminocyclohexanecarboxylic acid, p-aminobenzoic acid, 5-amino-1-naphthoic acid, p-aminophenylacetic acid, 3,5-diaminobenzoic acid, or the like.

Among them, preferred are the compounds of the formula (3) wherein $R^{12}$ is an alkyl group having 3 to 6 carbon atoms, a cycloalkyl group having 4 to 8 carbon atoms, phenyl group, a residue formed by eliminating amino group from an amine of the formula (4) wherein $R^{14}$ is an alkyl group having 1 to 8 carbon atoms or a halogen atom and s is an integer of 1 to 3, a residue formed by eliminating amino group from an amine of the formula (6) wherein $R^{17}$ is an alkyl group having 1 to 6 carbon atoms or a halogen atom and u is an integer of 1 to 3, or a residue formed by eliminating amino group from an amine of the formula (7) wherein $R^{18}$ is an alkylene group having 1 to 3 carbon atoms, $R^{19}$ is an alkyl group having 1 to 4 carbon atoms or a halogen atom and v is an integer of 0 to 3, $R^{13}$ is an alkyl group having 2 to 9 carbon atoms, a cycloalkyl group having 6 or 7 carbon atoms, phenyl group, a residue formed by eliminating the carboxyl group from an acid of the formula (8) wherein $R^{20}$ is an alkyl group having 1 to 6 carbon atoms or a halogen atom and w is an integer of 1 to 3, a residue formed by eliminating the carboxyl group from an acid of the formula (10) wherein $R^{23}$ is an alkyl group having 1 to 6 carbon atoms or a halogen atom, and y is an integer of 1 to 3, or a residue formed by eliminating the carboxyl group from an acid of the formula (11) wherein $R^{24}$ is an alkylene group having 1 to 3 carbon atoms, $R^{25}$ is an alkyl group having 1 to 4 carbon atoms or a halogen atom, and z is an integer of 0 to 3, q is 1 or 2, r is 1 or 2 and the sum of q and r is equal to 2 or 3.

Among them, more preferred are the compounds of the formula (3) wherein $R^{12}$ is an alkyl group having 3 or 4 carbon atoms, cyclohexyl group, phenyl group, a residue formed by eliminating amino group from an amine of the formula (4) wherein $R^{14}$ is an alkyl group having 1 to 4 carbon atoms and s is an integer of 1 to 3, a residue formed by eliminating amino group from an amine of the formula (6) wherein $R^{17}$ is an alkyl group having 1 to 4 carbon atoms and u is an integer of 1 to 3, or a residue formed by eliminating amino group from an amine of the formula (7) wherein $R^{18}$ is methylene group, $R^{19}$ is an alkyl group having 1 to 4 carbon atoms and v is an integer of 0 to 3, and $R^{13}$ is an alkyl group having 2 to 5 carbon atoms, a cyclohexyl group, phenyl group, a residue formed by eliminating the carboxyl group from an acid of the formula (8) wherein $R^{20}$ is an alkyl group having 1 to 4 carbon atoms and w is an integer of 1 to 3, a residue formed by eliminating the carboxyl group from an acid of the formula (10) wherein $R^{23}$ is an alkyl group having 1 to 4 carbon atoms, and y is an integer of 1 to 3, or a residue formed by eliminating the carboxyl group from an acid of the formula (11) wherein $R^{24}$ is methylene group, $R^{25}$ is an alkyl group having 1 to 4 carbon atoms, and z is an integer of 0 to 3, and q is 1 or 2, r is 1 or 2, and the sum of q and r is equal to 2 or 3.

Examples of the more preferred compounds of the formulas (1), (2) and (3) are p-phenylenediacetic acid dianilide, p-phenylenediacetic acid dicyclohexylamide, tricarballylic acid tris(2-methylcyclohexylamide), adipic acid bis(2,6-dimethylanilide), butanetetracarboxylic acid tetracyclohexylamide, butanetetracarboxylic acid tetrabenzylamide, trimesic acid tris(t-butylamide), trimesic acid tricyclohexylamide, trimesic acid tris(2-methylcyclohexylamide), trimesic acid tribenzylamide, 1,4-cyclohexanedicarboxylic acid dianilide, N,N'-dibenzoyl-1,4-diaminocyclohexane, N,N'-dicyclohexane-carbonyl-p-phenylenediamine, N,N'-dibenzoyl-1,5-diaminonaphthalene, 1,4-cyclohexanedicarboxylic acid dicyclohexylamide, terephthalic acid dianilide, terephthalic acid dibenzylamide and p-(N-butylcarbonylamino)-benzoic acid butylamide.

Polybutene-1 Resin Composition

The amide compounds of the formulas (1) to (3) can be added during the polymerization of the polybutene-1 resin or added to said resin previously prepared.

The amount of the amide compound for use in the present invention is about 0.001 to 10, preferably about 0.05 to 5, more preferably 0.1 to 1 part by weight, relative to 100 parts by weight of the polybutene-1 resin. If the proportion of the amide compound is less than 0.001 part by weight, the effect of accelerating the crystal transformation would not be obtained, while the use of the amide compound in excess of 10 parts by weight is not rewarded with a commensurate effect.

To the polybutene-1 resin composition of the present invention, known polyolefin resin modifiers can be added in the range which does not adversely affect the effects of the invention, in accordance with the purpose and use.

The polyolefin resin modifier include the additives described in "Self-Restrictive Requirements on Food-Contacting Articles Polyolefins And Certain Polymers, Third Edition"(September, 1988), the item "Polybutene-1", such as stabilizers, ultraviolet absorbers, antioxidants, surfactants, lubricants, fillers, foaming agent, foaming auxiliaries, plasticizers, crosslinking agents, crosslinking promoters, antistatic agents, neutralizers, antiblocking agents, anticlouding agents, flame retardants, dispersants, processing aids and the like.

More specific examples are epoxy compounds such as epoxidized soybean oil and the like, phosphorus compounds such as tris(mixed, mono and dinonylphenyl)phosphite and the like, sulfur compounds such as 3,3'-thiodipropionic acid dialkyl (each alkyl having 12 to 18 carbon atoms) esters and the like, phenol compounds such as tert-butyl group-substituted hydroxyltoluenes, n-octadecyl-$\beta$-(4'-hydroxy-3', 5',-di-tert-butylphenyl)propionate, tocopherol, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tetrakis[methylene-3-(3',5'-di-tert-butyl-4'-hydroxyphenyl)propionate]methane and the like, benzophenone compounds, benzotriazole compounds such as 2-(2'-hydroxy-3'-tert-butyl-5'-methylphenyl)-5-chlorobenzotriazole and the like, phosphite compounds, nonionic surfactants such as glycerol fatty acid ester, sorbitan fatty acid (6 to 22 carbon atoms) ester, polyoxyethylene (4 to 50 moles) alkyl (7 or more carbon atoms) phenylether, N,N-bis(2-hydroxyethyl)fatty (8 to 18 carbon atoms) amines and the like, aliphatic hydrocarbons such as liquid paraffin, hydrogenated polybutene and the like, higher fatty acids having 8 to 22 carbon atoms, metal (Al, Ca, Mg and Zn) salts of higher fatty acids having 8 to 22 carbon atoms or ricinoleic acid, triglycerides, acetylated monoglycerides, waxes, silicone oils such as dimethylpolysiloxane, methylphenylpolysiloxane and the like, oxides such as magnesium oxide, aluminum oxide, silicone oxide, titanium oxide, chromium oxide, iron oxide, zinc oxide and the like, hydroxides such as magnesium hydroxide, aluminum hydroxide and the like, carbonates such as calcium carbonate and the like, sulfates such as barium sulfate and the like, silicates such as aluminosilicates (Ca), calcium aluminum silicate, clay, diatomaceous earth, kaoline, talc, mica, hydrotalcite, zeolite, pearlite, glass fibers, colorants such as titanium yellow, cobalt blue, ultramarine and the like, metals such as aluminum and the like, sulfides such as zinc sulfide and the like, and polymers such as nylon, terephthalic acid-trimethylhexamethylenediamine condensate, polyethyleneterephthalate, polybutyleneterephthalate and the like.

The polybutene-1 resin composition thus obtained is excellent in crystallization (i.e., rapidly crystallizes from the melt), and when molded, gives a molded product comprising F-I and F-II, and then undergoes the F-II to F-I crystal transformation at a high rate when left to stand, giving a molded article comprising F-I. Additionally, the polybutene-1 resin composition of the invention forms a large amount of F-I immediately after molding. Therefore, the polybutene-1 resin composition of the invention has an excellent molding processability.

Further, when using certain amide compounds according to the present invention, particularly sulfonyldibenzoic acid dianilides, such as 4,4'-sulfonyldibenzoic acid dianilide, a molded article comprising F-II and F-III is easily obtained by a conventional melt molding method, although it was not conventionally known that F-III is obtained by melt molding method. When the resulting molded product is left to stand, the F-II in the molded product rapidly transforms into F-I, thereby giving a molded article comprising F-I and F-III crystals.

In this case, the relative proportions of F-I and F-III crystal phases in the obtained finished molded article may vary depending on the molding conditions, the amount of the amide compound and the like, but the amount of Form-I is usually about 1 to 99% by weight, particularly about 20 to 70% by weight, and the amount of Form-III is about 99 to 1% by weight, preferably about 80 to 30% by weight, based on the total amount of Form-I and Form-III.

The amount of sulfonyldibenzoic acid dianilides, such as 4,4'-sulfonyldibenzoic acid dianilide used for the purpose of forming F-III is basically within the above-specified range, i.e., about 0.001 to 10, preferably about 0.05 to 5, more preferably 0.1 to 1 part by weight, relative to 100 parts by weight of the polybutene-1 resin.

The finished molded article prepared from the resin composition of the invention comprises (a) Form-I crystal phase and amorphous phase or (b) Forms-I and III and amorphous phase. In either case, the proportion of the amorphous fraction depends on the kind and grade of the polybutene-1 resin used and the molding conditions, but generally ranges from about 20 to 80% by weight, particularly 30 to 70% by weight, based on the finished molded article.

The polybutene-1 resin composition of the present invention is prepared by mixing the prescribed components in a conventionally known mixer (Henschel mixer, ribbon blender, Banbury mixer or the like) and melting and kneading the mixture with a single- or twin-screw extruder or the like. The obtained resin composition can be advantageously used as a resin material for pipes, films, sheets, cups, bottles, ordinary utensils, automotive parts, containers, parts for electrical appliances, nonwoven fabrics and the like, and is molded by a method suitable for the intended product, such as injection molding, extrusion molding, blow molding, compression molding or the like.

The molding can be conducted under the conditions conventionally employed. For example, injection molding may be conducted at a resin temperature of about 140 to 300° C., preferably about 180 to 250° C., and at a mold temperature of about 10 to 80° C., preferably about 20 to 60° C. Extrusion molding is conducted, for example, at a resin temperature of about 140 to 300° C., preferably about 170 to 230° C., and when molding is conducted for preparing films and sheets, at a chill roll temperature of about 10 to 80° C., preferably about 20 to 60° C. For the preparation of pipes, the cooling for solidification after sizing may be carried out by air-cooling or water cooling, and it is recommended that the melt is cooled to a temperature of about 10 to 80° C., preferably about 20 to 60° C.

After the molding, the obtained molded product comprising F-II is left to stand at a temperature of about 0 to 50° C., preferably about 10 to 40° C. to thereby cause the transformation of F-II into F-I.

In the case of the composition of the invention comprising the sulfonyldibenzoic acid dianilides, such as 4,4'-sulfonyldibenzoic acid dianilide, the conditions under which said composition is molded and left to stand are basically the same as mentioned above.

EFFECT OF THE INVENTION

As mentioned above, addition of at least one of the amide compounds according to the invention produces a polybutene-1 resin composition which undergoes the F-II to F-I crystal transformation at an enhanced rate, forms a large amount of F-I immediately after molding and has a remarkably improved molding processability.

Thus, a molded product obtained by molding the polybutene-1 resin composition of the present invention substantially completes the necessary F-II to F-I transformation by allowing it to stand only for a short period immediately after molding, and the period for standing is much shorter than that of the polybutene-1 resin which does not contain an amide compound. In particular, the period required to complete about 80% of the F-II to F-I transformation (at this point, the molded product is substantially a finished molded article and therefore can be satisfactorily transported without damaging the properties thereof) is remarkably shortened, as apparent from the following Examples.

Among a series of the steps in a molding cycle, the step of allowing the molded product just after molding takes the longest time. Reduction in the time required for this step leads to a considerable improvement in productivity if the time reduction is in the order of at least several hours, or even in the order of 1 to 2 hours, and additionally save the space of warehouse wherein the molded product just after molding is left to stand. Thus, the present invention contributes to a great extent to the productivity and cost reduction.

Further, when a certain amide compound, particularly a sulfonyldibenzoic acid dianilide such as 4,4'-sulfonyldibenzoic acid dianilide is added as the amide compound to the polybutene-1 resin, a sufficient amount of F-III as well as F-II forms from the melt of said polybutene-1 resin composition. In addition, said F-II transforms into F-I in a short period, giving a molded product containing F-I and a sufficient amount of F-III. Thus, a polybutene-1 resin composition can be obtained which forms F-III by a melt molding method, and is useful for imparting low-temperature heat sealing properties, as will be apparent from the Examples that follow.

EXAMPLES

The following Examples and Comparative Examples illustrate the present invention in further detail.

In examples and comparative examples that follow, the identification of the F-I and F-II were carried out by the X-ray diffraction method described by T. Oda et al in Kobunshi Ronbunshu, 31, 2, 129–134 (1974), and F-III was identified by the melting point and infrared spectra as described by Bert H. et al, J. Polym. Sci., Part C, 6, 43–51 (1964).

Examples 1–39

To 100 parts by weight of a commercially available isotactic polybutene-1 resin (MFR: 0.2 g/10 min.) was added each of the amide compounds shown in Table 1 in the amount shown in Table 1. The mixture was milled in a Henschel mixer and melted and kneaded in a 20 mm-diameter single-screw extruder at 230° C. to obtain pellets.

The pellets were compression-molded at 200° C. and 100 kg/cm$^2$ for 5 minutes, and then the molded product was crystallized in a compression molding machine for crystallization at 50° C. for 5 minutes, giving a 0.2 mm-thick sheet.

Subsequently, about 5 mg of the polybutene-1 resin pressed sheet was melted by a DSC (differential scanning calorimeter) at 200° C. for 10 minutes and cooled at a rate of 20° C./min. The crystallization temperature (Tc) was measured and shown in Table 1.

Comparative Example 1

The crystallization temperature of the polybutene-1 resin as such used in Example 1 was measured in the same manner as in Example 1. The results are shown in Table 1.

As apparent from Table 1, the polybutene-1 resin composition of the invention comprising a polybutene-1 resin and the amide compound has a markedly higher crystallization temperature than that of the polybutene-1 resin which does not contain the amide compound. Therefore, the composition of the present invention is advantageous in that it crystallizes faster from the melt and therefore is molding operation is rapidly carried out.

The chemical structures of the amide compounds used in Examples 1 to 39 and other examples are shown in Table 2 below.

TABLE 1

| | Additive | Amount (wt. part) | Tc (° C.) |
|---|---|---|---|
| Ex. 1 | Trimesic acid tris(2-methylcyclohexylamide) | 0.5 | 87 |
| Ex. 2 | Trimesic acid tris(2-methylcyclohexylamide) | 0.25 | 86 |
| Ex. 3 | Trimesic acid tris (2-methylcyclohexylamide) | 0.1 | 84 |
| Ex. 4 | Trimesic acid tris(t-butylamide) | 0.5 | 84 |
| Ex. 5 | Trimesic acid tris(t-butylamide) | 0.25 | 84 |
| Ex. 6 | Trimesic acid tris(t-butylamide) | 0.1 | 83 |
| Ex. 7 | Trimesic acid tribenzylamide | 0.5 | 85 |
| Ex. 8 | Trimesic acid tribenzylamide | 0.25 | 84 |
| Ex. 9 | Trimesic acid tricyclohexylamide | 0.5 | 82 |
| Ex. 10 | Triinesic acid tricyclopentylamide | 0.5 | 81 |
| Ex. 11 | Trimesic acid tris(3,5-dimethylanilide) | 0.5 | 80 |
| Ex. 12 | Tricarballytic acid tricyclohexylamide | 0.5 | 78 |
| Ex. 13 | BTC tetracyclohexylamide | 0.5 | 82 |
| Ex. 14 | BTC tetracyclohexylamide | 0.25 | 81 |
| Ex. 15 | BTC tetrabenzylamide | 0.5 | 80 |
| Ex. 16 | BTC tetra(4-methylanilide) | 0.5 | 79 |
| Ex. 17 | BTC tetra(n-hexylamide) | 0.5 | 76 |
| Ex. 18 | 1,4-Cyclohexanedicarboxylic acid dianilide | 0.5 | 84 |
| Ex. 19 | 1,4-Cyclohexanedicarboxylic acid dianilide | 0.25 | 83 |
| Ex. 20 | 1,4-Cyclohexanedicarboxylic acid bis(2,6-diethylanilide) | 0.5 | 77 |

TABLE 1-continued

| | Additive | Amount (wt. part) | Tc (° C.) |
|---|---|---|---|
| Ex. 21 | p-Phenylenediacetic acid dianilide | 0.5 | 80 |
| Ex. 22 | p-Phenylenediacetic acid dicyclohexylamide | 0.5 | 78 |
| Ex. 23 | Adipic acid dicyclohexylamide | 0.5 | 78 |
| Ex. 24 | Adipic acid bis(4-methylanilide) | 0.5 | 77 |
| Ex. 25 | Adipic acid bis(2,6-dimethylanilide) | 0.5 | 74 |
| Ex. 26 | 2,6-Naphthalenedicarboxylic acid dicyclohexylamide | 0.5 | 78 |
| Ex. 27 | Terephthalic acid dicyclohexylamide | 0.5 | 76 |
| Ex. 28 | Terephthalic acid dianilide | 0.5 | 75 |
| Ex. 29 | N,N'-dibenzoyl-1,4-diaminocyclohexane | 0.5 | 84 |
| Ex. 30 | N,N'-dibenzoyl-1,4-diaminocyclohexane | 0.25 | 83 |
| Ex. 31 | N,N'-dicyclohexanecarbonyl-1,4-diaminocyclohexane | 0.5 | 80 |
| Ex. 32 | N,N'-bis(p-methylbenzoyl)-1,4-diaminocyclohexane | 0.5 | 80 |
| Ex. 33 | N,N'-dibenzoyl-1,5-diaminonaphthalene | 0.5 | 81 |
| Ex. 34 | N,N'-dicyclohexanecarbonyl-p-phenylenediamine | 0.5 | 81 |
| Ex. 35 | N,N'-dibenzoyl-p-phenylenediamine | 0.5 | 78 |
| Ex. 36 | N,N'-dibenzoyl-4,4'-diaminodiphenylether | 0.5 | 77 |
| Ex. 37 | N,N'-bis(n-heptanoyl)-1,4-diaminocyclohexane | 0.5 | 77 |
| Ex. 38 | N,N'-dibenzoyl-4,4'-diaminodiphenylmethane | 0.5 | 78 |
| Ex. 39 | p-(N-butylcarbonylamino)-benzoic acid butylamide | 0.5 | 75 |
| Comp. Ex. 1 | None | 0 | 48 |

TABLE 2

| Example | Structure | Formula |
|---|---|---|
| 1–3, 40–42 | 1,3,5-benzenetricarboxylic acid tris(2-methylcyclohexylamide) | (1) |
| 4–6, 43–45 59, 68 | 1,3,5-benzenetricarboxylic acid tris(tert-butylamide) | (1) |

TABLE 2-continued

| Example | Structure | Formula |
|---|---|---|
| 7–8, 46, 47 | 1,3,5-benzenetricarboxylic acid tris(benzylamide) | (1) |
| 9, 48, 58, 69 | 1,3,5-benzenetricarboxylic acid tris(cyclohexylamide) | (1) |
| 10 | 1,3,5-benzenetricarboxylic acid tris(cyclopentylamide) | (1) |
| 11 | 1,3,5-benzenetricarboxylic acid tris(3,5-dimethylphenylamide) | (1) |
| 12 | propane-1,2,3-tricarboxylic acid tris(cyclohexylamide) | (1) |
| 13, 14, 49, 61, 71 | butane-1,2,3,4-tetracarboxylic acid tetrakis(cyclohexylamide) | (1) |

TABLE 2-continued

| Example | Structure | Formula |
|---|---|---|
| 15 | Tetrakis(benzylcarbamoylmethyl/methine) structure: CH2-CH(CONH-CH2-C6H5)-CH(CONH-CH2-C6H5)-CH2, with two additional CONH-CH2-C6H5 groups on the CH carbons | (1) |
| 16 | Same as Ex. 15 but with 4-methylbenzyl (CH2-C6H4-CH3) groups | (1) |
| 17 | CH2-CH(CONH-(CH2)5CH3)-CH(CONH-(CH2)5CH3)-CH2 with two additional CONH-(CH2)5CH3 groups | (1) |
| 18, 19, 50 | C6H5-NHCO-(cyclohexylene)-CONH-C6H5 | (1) |
| 20 | 2,6-diethylphenyl-NHCO-(cyclohexylene)-CONH-2,6-diethylphenyl | (1) |
| 21, 54, 62, 72 | C6H5-NHCO-CH2-(p-C6H4)-CH2-CONH-C6H5 | (1) |
| 22, 63 | cyclohexyl-NHCO-CH2-(p-C6H4)-CH2-CONH-cyclohexyl | (1) |
| 23 | cyclohexyl-NHCO-(CH2)4-CONH-cyclohexyl | (1) |
| 24 | H3C-(p-C6H4)-NHCO-(CH2)4-CONH-(p-C6H4)-CH3 | (1) |

TABLE 2-continued

| Example | Structure | Formula |
|---|---|---|
| 25, 64, 73 | 2,6-(CH₃)₂C₆H₃-NHCO-(CH₂)₄-CONH-C₆H₃(CH₃)₂-2,6 | (1) |
| 26 | cyclohexyl-NHCO-(2,6-naphthalene)-CONH-cyclohexyl | (1) |
| 27 | cyclohexyl-NHCO-C₆H₄-CONH-cyclohexyl | (1) |
| 28 | C₆H₅-NHCO-C₆H₄-CONH-C₆H₅ | (1) |
| 29, 30, 55, 65, 74 | C₆H₅-CONH-C₆H₁₀-NHCO-C₆H₅ | (2) |
| 31 | cyclohexyl-CONH-C₆H₁₀-NHCO-cyclohexyl | (2) |
| 32, 56 | 4-CH₃-C₆H₄-CONH-C₆H₁₀-NHCO-C₆H₄-CH₃-4 | (2) |
| 33, 57 | C₆H₅-CONH-(1,5-naphthalene)-NHCO-C₆H₅ | (2) |
| 34, 66 | cyclohexyl-CONH-C₆H₄-NHCO-cyclohexyl | (2) |
| 35 | C₆H₅-CONH-C₆H₄-NHCO-C₆H₅ | (2) |
| 36 | C₆H₅-CONH-C₆H₄-O-NHCO-C₆H₅ | (2) |

TABLE 2-continued

| Example | Structure | Formula |
|---|---|---|
| 37 | $H_3C(CH_2)_6$—CONH—⟨cyclohexane⟩—NHCO—$(CH_2)_6CH_3$ | (2) |
| 38 | ⟨phenyl⟩—CONH—⟨phenyl⟩—$CH_2$—⟨phenyl⟩—NHCO—⟨phenyl⟩ | (2) |
| 39, 67 | $H_3C(CH_2)_3$—CONH—⟨phenyl⟩—CONH—$(CH_2)_3CH_3$ | (3) |
| 51 | ⟨cyclohexyl⟩—NHCO—⟨cyclohexane⟩—CONH—⟨cyclohexyl⟩ | (1) |
| 52 | ⟨phenyl⟩—$CH_2$—NHCO—⟨phenyl⟩—CONH—$CH_2$—⟨phenyl⟩ | (1) |
| 53 | ⟨2-methylcyclohexyl⟩—NHCO—⟨phenyl⟩—CONH—⟨2-methylcyclohexyl⟩ | (1) |
| 60, 70 | Tris(2-methylcyclohexylcarbamoylmethyl)methane structure: $CH_2$—CH—$CH_2$ with three CONH—(2-methylcyclohexyl) groups | (1) |
| 75, 76 | ⟨phenyl⟩—NHCO—⟨phenyl⟩—$SO_2$—⟨phenyl⟩—CONH—⟨phenyl⟩ | (1) |

Examples 40–57

Pressed sheets each of which comprised each of the amide compounds shown in Table 3 were prepared in the same manner as in Example 1 and left to stand at room temperature.

Samples (about 5 mg each) were prepared by punching the polybutene-1 resin pressed sheet immediately after molding and after every 10 hours of standing at room temperature. Each sample was set in the sample holder of a DSC and heated in a nitrogen gas atmosphere at a rate of 10° C./min. to conduct the differential scanning calorimetry.

The peak area of F-II (melting peak temperature: 111 to 116° C.) (hereinafter briefly referred to as "S2") and the peak area of F-I (melting peak temperature: 122 to 128° C.) (hereinafter briefly referred to as "S1") on the obtained DSC thermogram were determined, and then there was obtained a curve showing the time course of the percentage of the F-I peak area relative to the total peak area, i.e., [S1/(S1+S2)]× 100 (%) (hereinafter referred to as "Z").

When the value of Z, which represents a proportion of F-I and the degree of the F-II to F-I transformation, becomes about 80%, the crystal phase of the sample (molded product) is mostly composed of F-I, and therefore the sample is practically a finished article and can be transported or handled. Therefore, the time (in hours) required for the sample to have Z value of 80% (hereinafter referred to as "80% transformation time") was determined from the obtained curve.

Table 3 shows Z value each of the samples immediately after molding and 80% transformation time each of the samples.

Comparative Example 2

The Z value and 80% transformation time of the polybutene-1 resin as such used in Example 40 were determined in the same manner as in Example 40.

Table 3 shows the results.

crystallized in a cold pressing machine for 5 minutes, giving a 0.2 mm-thick sheet.

Subsequently, about 5 mg of the polybutene-1 resin pressed sheet was melted by a DSC at 200° C. for 10 minutes and cooled at a rate of 20° C./min. The crystallization temperature (Tc) was measured.

The results are shown in Table 4.

Comparative Example 3

The crystallization temperature of the polybutene-1 resin as such used in Example 58 was determined in the same

TABLE 3

|  | Additive | Amount (wt. part) | Z immediately after molding (%) | 80% transformation time (h) |
| --- | --- | --- | --- | --- |
| Ex. 40 | Trimesic acid tris(2-methylcyclohexylamide) | 0.5 | 37 | 23 |
| Ex. 41 | Trimesic acid tris(2-methylcyclohexylamide) | 0.25 | 36 | 26 |
| Ex. 42 | Trimesic acid tris(2-methylcyclohexylamide) | 0.1 | 34 | 28 |
| Ex. 43 | Trimesic acid tris(t-butylamide) | 0.5 | 40 | 18 |
| Ex. 44 | Trimesic acid tris(t-butylamide) | 0.25 | 38 | 21 |
| Ex. 45 | Trimesic acid tris(t-butylamide) | 0.1 | 37 | 22 |
| Ex. 46 | Trimesic acid tribenzylamide | 0.5 | 37 | 26 |
| Ex. 47 | Trimesic acid tribenzylamide | 0.25 | 36 | 27 |
| Ex. 48 | Trimesic acid tricyclohexylamide | 0.5 | 36 | 24 |
| Ex. 49 | BTC tetracyclohexylamide | 0.5 | 33 | 35 |
| Ex. 50 | 1,4-Cyclohexanedicarboxylic acid diamide | 0.5 | 36 | 28 |
| Ex. 51 | 1,4-Cyclohexanedicarboxylic acid dicyclohexylamide | 0.5 | 34 | 29 |
| Ex. 52 | Terephthalic acid dibenzylamide | 0.5 | 35 | 28 |
| Ex. 53 | Terephthalic acid bis(2-methylcyclohexylamide) | 0.5 | 33 | 30 |
| Ex. 54 | p-Phenylene diacetic acid dianilide | 0.5 | 35 | 29 |
| Ex. 55 | N,N'-dibenzoyl-1,4-diaminocyclohexane | 0.5 | 34 | 32 |
| Ex. 56 | N,N'-bis(p-methylbenzoyl)-1,4-diaminocyclohexane | 0..5 | 33 | 42 |
| Ex. 57 | N,N'-dibenzoyl-1,5-diaminonaphthalene | 0.5 | 32 | 46 |
| Comp. Ex. 2 | None | 0 | 19 | 80 |

It is apparent from Table 3 that, compared with the polybutene-1 resin as such which does not contain the amide compound according to the present invention, the molded products prepared from the polybutene-1 resin compositions of the invention have a larger proportion of F-I immediately after molding, and rapidly undergoes F-II to F-I transformation, as demonstrated by the drastic reduction in 80% transformation time. Therefore, the polybutene-1 resin compositions of the invention is quite advantageous in that it achieves a considerable improvement in productivity.

It is also seen from Table 3 that the use of the amide compounds of the formula (1) wherein $R^1$ is a trimesic acid residue achieves shorter 80% transformation time, compared with the use of the same amount (0.5 part by weight) of the compounds of the formula (1) wherein $R^1$ is a residue of tetracarboxylic acid or dicarboxylic acid.

Examples 58–67

A 0.25 part by weight of each of the amide compounds shown in Table 4 was added to 100 parts by weight of a commercially available isotactic polybutene-1 resin (MFR: 0.05 g/10 min.). The mixture was milled in a Henschel mixer and melted and kneaded in a 20 mm-diameter single-screw extruder at 230° C. to obtain pellets.

The pellets were compression-molded at 200° C. and 100 kg/cm² for 5 minutes and then the molded product was manner as in Example 58. The result is shown in Table 4.

TABLE 4

|  | Additive | Amount (wt. part) | Tc (° C.) |
| --- | --- | --- | --- |
| Ex. 58 | Trimesic acid tricyclohexylamide | 0.25 | 82 |
| Ex. 59 | Trimesic acid tris(t-butylamide) | 0.25 | 83 |
| Ex. 60 | Tricarballylic acid tris(2-methylcyclohexylamide) | 0.25 | 75 |
| Ex. 61 | BTC tetracyclohexylamide | 0.25 | 78 |
| Ex. 62 | p-Phenylenediacetic acid dianilide | 0.25 | 82 |
| Ex. 63 | p-Phenylenediacetic acid dicyclohexylamide | 0.25 | 78 |
| Ex. 64 | Adipic acid bis(2,6-dimethylanilide) | 0.25 | 79 |
| Ex. 65 | N,N'-dibenzoyl-1,4-diaminocyclohexane | 0.25 | 82 |
| Ex. 66 | N,N'-dicyclohexanecarbonyl-p-phenylenediamine | 0.25 | 80 |
| Ex. 67 | p-(N-butylcarbonylamino)-benzoic acid butylamide | 0.25 | 76 |
| Comp. Ex. 3 | None | 0 | 70 |

Examples 68–74

A pressed sheet comprising each of the amide compounds shown in Table 5 was prepared in the same manner as in Example 58.

Samples (about 5 mg each) were obtained by punching the polybutene-1 resin pressed sheet immediately after molding and after every 10 hours of standing at room temperature. Each sample was set in the sample holder of a DSC and heated in a nitrogen gas atmosphere at 10° C./min. to conduct the differential scanning calorimetry.

The value of Z immediately after molding and 80% transformation time were determined in the same manner as in Example 40. Table 5 shows the results.

Comparative Example 4

The value of Z immediately after molding and 80% transformation time of the polybutene-1 resin as such used in Example 68 were determined in the same manner as in Example 68. The results are shown in Table 5.

crystallized by cooling at a rate of 20° C./min to 25° C. to prepare a crystallized product. The resulting crystallized products (samples) were left to stand at a temperature of 25° C.

Using these samples, melting peak was measured, immediately after the preparation of the sample (0 hour) and 24, 48, 72 and 96 hours thereafter, by heating each of the samples at a rate of 10° C./min. with use of DSC to determine the proportions of F-I, F-II and F-III in terms of the melting peak area.

The melting temperature and the peak area percentage each of the crystals F-I, F-II and F-III were shown in Table 6.

Comparative Example 5

The melting temperature and the peak area percentage each of the crystals in the polybutene-1 resin as such were determined in the same manner as in Example 75. The results were shown in Table 6.

TABLE 5

|  | Additive | Amount (wt. part) | Z immediately after molding (%) | 80% transformation time (h) |
|---|---|---|---|---|
| Ex. 68 | Trimesic acid tris(t-butylamide) | 0.25 | 49 | 12 |
| Ex. 69 | Trimesic acid tricyclohexylamide | 0.25 | 30 | 15 |
| Ex. 70 | Tricarballylic acid tris(2-methylcyclohexylamide) | 0.25 | 45 | 18 |
| Ex. 71 | BTC tetracyclohexylamide | 0.25 | 52 | 18 |
| Ex. 72 | p-Phenylenediacetic acid dianilide | 0.25 | 29 | 17 |
| Ex. 73 | Adipic acid bis(2,6-dimethylanilide) | 0.25 | 30 | 17 |
| Ex. 74 | N,N'-dibenzoyl-1,4-diaminocyclohexane | 0.25 | 28 | 23 |
| Comp. Ex. 4 | None | 0 | 21 | 45 |

Example 75

A polybutene-1 resin pressed sheet was prepared in the same manner as in Example 1 with the exception of using 0.5 part by weight of 4,4'-sulfonyldibenzoic acid dianilide as the amide compound, per 100 parts by weight of the polybutene-1 resin.

Five test pieces (about 5 mg each) were cut out from the obtained sheet and each of the samples was set in the sample holder of a DSC and melted at 200° C. for 10 minutes,

TABLE 6

|  | Additive | Amount (wt. part) | Crystal form | m.p. (° C.) | Area % | | | | |
|---|---|---|---|---|---|---|---|---|---|
|  |  |  |  |  | 0 h | 24 h | 48 h | 72 h | 96 h |
| Ex. 75 | 4,4'-sulfonyldibenzoic acid dianilide | 0.5 | F-III | 97 | 74 | 73 | 72 | 71 | 70 |
|  |  |  | F-II | 112 | 26 | 10 | 7 | 0 | 0 |
|  |  |  | F-I | 125 | 0 | 17 | 21 | 29 | 30 |
| Comp. Ex. 5 | None | 0 | F-III | — | 0 | 0 | 0 | 0 | 0 |
|  |  |  | F-II | 112 | 100 | 70 | 53 | 37 | 25 |
|  |  |  | F-I | 125 | 0 | 30 | 47 | 63 | 75 |

As seen from Table 6, the polybutene-1 resin composition comprising a polybutene-1 resin and 4,4'-sulfonyldibenzoic acid dianilide can give a molded product comprising F-III having a low melting point of 97° C. in a high proportion, whereas the polybutene-1 resin as such which does not contain said amide compound can not produce a molded product containing such F-III.

The content of F-III does not substantially vary at room temperature. Therefore, the finished molded article obtained will have an excellent low-temperature heat sealing properties.

Also as seen from Table 6, the molded product immediately after molding contained F-III and F-II, and then the F-II fairly rapidly transformed into F-I to thereby give a molded product containing F-III and F-I and free of F-II after about 60 hours of standing at 25° C. Thus, the transformation from F-II into F-I is also accelerated, compared with the polybutene-1 resin as such.

Example 76

A sample was prepared in the same manner as in Example 75 with the exception of using a commercially available copolymer of butene-1 (as the major comonomer) and ethylene (MFR: 1.0 g/10 min.), and the melting peak temperature and area percentage each of the crystals were determined in the same manner as in Example 75.

Table 7 shows the results.

Comparative Example 6

The melting peak temperature and area percentage each of the crystals in the polybutene-1 resin as such used in Example 76 were determined in the same manner as in Example 75.

Table 7 shows the results.

|  | Additive | Amount (wt. part) | Crystal form | m.p. (° C.) | Area % |  |  |  |  |
|---|---|---|---|---|---|---|---|---|---|
|  |  |  |  |  | 0 h | 24 h | 48 h | 72 h | 96 h |
| Ex. 76 | 4,4'-sulfonyldibenzoic acid dianilide | 0.5 | F-III | 88 | 69 | 68 | 66 | 64 | 63 |
|  |  |  | F-II | 98 | 31 | 10 | 6 | 0 | 0 |
|  |  |  | F-I | 113 | 0 | 22 | 28 | 36 | 37 |
| Comp. Ex. 6 | None | 0 | F-III | — | 0 | 0 | 0 | 0 | 0 |
|  |  |  | F-II | 98 | 100 | 60 | 35 | 22 | 8 |
|  |  |  | F-I | 113 | 0 | 40 | 65 | 78 | 92 |

As seen from Table 7, when the butene-1-ethylene copolymer is used, the resulting resin composition containing 4,4'-sulfonyldibenzoic acid dianilide can give a molded product comprising F-III having a lower melting point of 88° C.

Thus, the composition of Example 76 has more excellent low-temperature heat sealing properties.

We claim:

1. A polybutene-1 resin composition consisting essentially of
   (i) a polybutene-1 resin and
   (ii) an amide compound,
   said polybutene-1 being a butene-1 homopolymer, a copolymer of butene-1 and another α-olefin which contains at least 60% by weight of butene-1, or a polymer blend comprising (a) 60 to 99% by weight of at least one member selected from the group consisting of said butene-1 homopolymer and said butene-1 copolymer and (b) 1 to 40% by weight of at least one member selected from the group consisting of thermoplastic resins and elastomers, and the amide compound being at least one member selected from the group consisting of:

(1) polycarboxylic acid-type amide compounds represented by the formula (1)

$$R^1—(CONH—R^2)_k \quad (1)$$

wherein k is an integer of 2 to 6;

$R^1$ is a residue which is formed by elimination of all the carboxyl groups of a saturated or unsaturated aliphatic polycarboxylic acid having 3 to 16 carbon atoms, a residue which is formed by elimination of all the carboxyl groups of a saturated or unsaturated alicyclic polycarboxylic acid having 7 to 16 carbon atoms or a residue which is formed by elimination of all the carboxyl groups of an aromatic polycarboxylic acid having 8 to 22 carbon atoms; and $R^2$ is an alkyl group having 3 to 6 carbon atoms, an alkenyl group having 2 to 8 carbon atoms, a cycloalkyl group having 3 to 12 carbon atoms, a cycloalkenyl group having 3 to 12 carbon atoms, phenyl group, naphthyl group, anthryl group, a group represented by the formula (a), (b), (c) or (d);

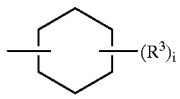
(a)

-continued

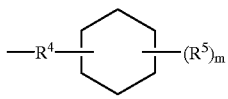
(b)

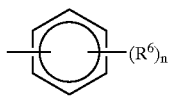
(c)

or

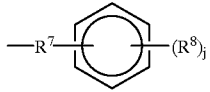
(d)

(wherein $R^3$, $R^5$, $R^6$ and $R^8$ are the same or different and each represents an alkyl group having 1 to 18 carbon atoms, an alkenyl group having 2 to 18 carbon atoms, an alkoxyl group having 1 to 8 carbon atoms, a cycloalkyl group having 3 to 12 carbon atoms, phenyl group or a halogen atom, $R^4$ and $R^7$ are the same or different and each represents a straight- or branched-chain alkylene group having 1 to 4 carbon atoms, i and n each represents an integer of 1 to 5, and m and j each represents an integer of 0 to 5), (2) polyamine-type amide compounds represented by the formula

$$R^9-(NHCO-R^{10})_p \qquad (2)$$

wherein $R^9$ is a residue which is formed by elimination of all the amino groups of a saturated or unsaturated alicyclic polyamine having 3 to 25 carbon atoms or a residue which is formed by elimination of all the amino groups of an aromatic polyamine having 6 to 25 carbon atoms, $R^{10}$ has the same meaning as $R^2$ in the formula (1), and p is an integer of 2 to 6, and (3) amino-type amide compounds represented by the formula

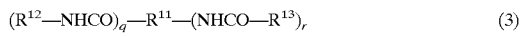

$$(R^{12}-NHCO)_q-R^{11}-(NHCO-R^{13})_r \qquad (3)$$

wherein $R^{11}$ is a residue which is formed by elimination of all the amino groups and all the carboxyl groups of a saturated aliphatic amino acid having 2 to 25 carbon atoms, a residue which is formed by elimination of all the amino groups and all the carboxyl groups of an unsaturated aliphatic amino acid having 3 to 25 carbon atoms, a residue which is formed by elimination of all the amino groups and all the carboxyl groups of a saturated or unsaturated alicyclic amino acid having 7 to 15 carbon atoms or a residue which is formed by elimination of all the amino groups and all the carboxyl groups of an aromatic amino acid having 7 to 25 carbon atoms, $R^{12}$ and $R^{13}$ each have the same meaning as $R^2$ in the formula (1) and are the same or different, and q and r each represents an integer of 1 to 5, and the sum of q plus r is equal to 2 to 6.

2. The polybutene-1 resin composition according to claim 1 wherein the amide compound is at least one amide compound represented by the formula (1).

3. The polybutene-1 resin composition according to claim 2 wherein the amide compound is at least one amide compound represented by the formula (1) wherein $R^1$ is a residue which is formed by elimination of all the carboxyl groups of a saturated aliphatic polycarboxylic acid having 4 to 10 carbon atoms, a residue which is formed by elimination of all the carboxyl groups of a saturated alicyclic polycarboxylic acid having 8 to 16 carbon atoms or a residue which is formed by elimination of all the carboxyl groups of an aromatic polycarboxylic acid having 8 to 17 carbon atoms.

4. The polybutene-1 resin composition according to claim 2 wherein $R^1$ is a residue formed by elimination of all the carboxyl groups of a polycarboxylic acid selected from the group consisting of p-phenylenediacetic acid, adipic acid, 2,6-naphthalenedicarboxylic acid, terephthalic acid, 1,4-cyclohexanedicarboxylic acid, trimesic acid, tricarballylic acid, DSTC (diphenylsulfonetetracarboxylic acid), TDA (3,4-dicarboxy-1,2,3,4-tetrahydro-1-naphthalenesuccinic acid), BTC (1,2,3,4-butanetetracarboxylic acid) and 4,4'-sulfonyldibenzoic acid.

5. The polybutene-1 resin composition according to claim 2 wherein $R^1$ is a residue formed by elimination of all the carboxyl groups of trimesic acid.

6. The polybutene-1 resin composition according to claim 2 wherein the amide compound is at least one amide compound of the formula (1) wherein k is 3, $R^1$ is a residue which is formed by elimination of all the carboxyl groups of a saturated aliphatic tricarboxylic acid having 6 to 10 carbon atoms, a residue which is formed by elimination of all the carboxyl groups of a saturated alicyclic tricarboxylic acid having 8 to 12 carbon atoms or a residue which is formed by elimination of all the carboxyl groups of an aromatic tricarboxylic acid having 9 to 12 carbon atoms, and $R^2$ is an alkyl group having 3 to 6 carbon atoms, a cycloalkyl group having 4 to 8 carbon atoms, phenyl group, a group of the formula (a) wherein $R^3$ is an alkyl group having 1 to 8 carbon atoms or a halogen atom and i is an integer of 1 to 3, a group of the formula (c) wherein $R^6$ is an alkyl group having 1 to 6 carbon atoms or a halogen atom and n is an integer of 1 to 3, or a group of the formula (d) wherein $R^7$ is an alkylene group having 1 to 3 carbon atoms, $R^8$ is an alkyl group having 1 to 4 carbon atoms or a halogen atom and j is an integer of 0 to 3.

7. The polybutene-1 resin composition according to claim 2 wherein the amide compound is at least one amide compound of the formula (1) wherein k is 3, $R^1$ is a residue formed by removing all the carboxyl groups from a tricarboxylic acid selected from the group consisting of trimesic acid, tricarballylic acid and 1,3,5-pentanetricarboxylic acid, and $R^2$ is an alkyl group having 3 or 4 carbon atoms, cyclohexyl group, phenyl group, a group of the formula (a) wherein $R^3$ is an alkyl group having 1 to 4 carbon atoms and i is an integer of 1 to 3, a group of the formula (c) wherein $R^6$ is an alkyl group having 1 to 4 carbon atoms and n is an integer of 1 to 3, or a group of the formula (d) wherein $R^7$ is methylene group, $R^8$ is an alkyl group having 1 to 4 carbon atoms and j is an integer of 0 to 3.

8. The polybutene-1 resin composition according to claim 2 wherein the amide compound is at least one amide compound of the formula (1) wherein k is 2, $R^1$ is a residue which is formed by elimination of all the carboxyl groups of a saturated aliphatic dicarboxylic acid having 4 to 10 carbon atoms, a residue which is formed by elimination of all the carboxyl groups of a saturated alicyclic dicarboxylic acid having 7 to 10 carbon atoms or a residue which is formed by elimination of all the carboxyl groups of an aromatic dicarboxylic acid having 8 to 17 carbon atoms, and $R^2$ is an alkyl group having 3 to 6 carbon atoms, a cycloalkyl group having 4 to 8 carbon atoms, phenyl group, a group of the formula (a) wherein $R^3$ is an alkyl group having 1 to 8 carbon atoms or a halogen atom and i is an integer of 1 to 3, a group of the formula (c) wherein $R^6$ is an alkyl group having 1 to 6 carbon atoms or a halogen atom and n is an integer of 1 to 3, or a group of the formula (d) wherein $R^7$ is an alkylene group having 1 to 3 carbon atoms, $R^8$ is an alkyl group having 1 to 4 carbon atoms or a halogen atom and j is an integer of 0 to 3.

9. The polybutene-1 resin composition according to claim 2 wherein the amide compound is at least one amide compound of the formula (1) wherein k is 2, R$^1$ is a residue formed by removing all the carboxyl groups from a dicarboxylic acid selected from the group consisting of p-phenylenediacetic acid, adipic acid, 2,6-naphthalenedicarboxylic acid, terephthalic acid, 1,4-cyclohexanedicarboxylic acid and 4,4'-sulfonyldibenzoic acid, and R$^2$ is an alkyl group having 3 or 4 carbon atoms, cyclohexyl group, phenyl group, a group of the formula (a) wherein R$^3$ is an alkyl group having 1 to 4 carbon atoms and i is an integer of 1 to 3, a group of the formula (c) wherein R$^6$ is an alkyl group having 1 to 4 carbon atoms and n is an integer of 1 to 3, or a group of the formula (d) wherein R$^7$ is methylene group, R$^8$ is an alkyl group having 1 to 4 carbon atoms and j is an integer of 0 to 3.

10. The polybutene-1 resin composition according to claim 2 wherein the amide compound is sulfonyldibenzoic acid dianilide.

11. The polybutene-1 resin composition according to claim 10 wherein the amide compound is 4,4'-sulfonyldibenzoic acid dianilide.

12. The polybutene-1 resin composition according to claim 1 wherein the amide compound is at least one amide compound represented by the formula (2).

13. The polybutene-1 resin composition according to claim 12 wherein the amide compound is at least one amide compound represented by the formula (2) wherein R$^9$ is a residue of a saturated alicyclic polyamine having 6 to 15 carbon atoms or a residue of an aromatic polyamine having 6 to 17 carbon atoms.

14. The polybutene-1 resin composition according to claim 12 wherein the amide compound is at least one amide compound represented by the formula (2) wherein R$^9$ is a residue formed by elimination of all the amino groups of p-phenylenediamine, 1,5-diaminonaphthalene, 4,4'-diaminodiphenylmethane, 4,4'-diaminodiphenylether, 4,4'-diaminodiphenylsulfone, 1,4-diaminocyclohexane, 4,4'-diaminodicyclohexylmethane, tris(4-aminophenyl)methane, 3,3'-diaminobenzidine or melamine.

15. The polybutene-1 resin composition according to claim 12 wherein the amide compound is at least one amide compound represented by the formula (2) wherein p is 2 or 3, R$^9$ is a residue of a saturated alicyclic di- or triamine having 6 to 13 carbon atoms or a residue of an aromatic di- or triamine having 6 to 13 carbon atoms, and R$^{10}$ is an alkyl group having 2 to 9 carbon atoms, a cycloalkyl group having 6 or 7 carbon atoms, phenyl group, a group of the formula (a) wherein R$^3$ is an alkyl group having 1 to 6 carbon atoms or a halogen atom and i is an integer of 1 to 3, a group of the formula (c) wherein R$^6$ is an alkyl group having 1 to 6 carbon atoms or a halogen atom and n is an integer of 1 to 3, or a group of the formula (d) wherein R$^7$ is an alkylene group having 1 to 3 carbon atoms, R$^8$ is an alkyl group having 1 to 4 carbon atoms or a halogen atom and j is an integer of 0 to 3.

16. The polybutene-1 resin composition according to claim 12 wherein the amide compound is at least one amide compound represented by the formula (2) wherein p is 2, R$^9$ is a residue formed by removing all the amino groups from a diamine selected from the group consisting of p-phenylenediamine, 1,5-diaminonaphthalene, 4,4'-diaminodiphenylmethane, 4,4'-diaminodiphenylether, 4,4'-diaminodiphenylsulfone, 1,4-diaminocyclohexane and 4,4'-diaminodicyclohexylmethane, and R$^{10}$ is an alkyl group having 2 to 5 carbon atoms, a cyclohexyl group, phenyl group, a group of the formula (a) wherein R$^3$ is an alkyl group having 1 to 4 carbon atoms and i is an integer of 1 to 3, a group of the formula (c) wherein R$^6$ is an alkyl group having 1 to 4 carbon atoms and n is an integer of 1 to 3, or a group of the formula (d) wherein R$^7$ is methylene group, R$^8$ is an alkyl group having 1 to 4 carbon atoms and j is an integer of 0 to 3.

17. The polybutene-1 resin composition according to claim 1 wherein the amide compound is an amide compound represented by the formula (3).

18. The polybutene-1 resin composition according to claim 17 wherein the amide compound is an amide compound represented by the formula (3) wherein R$^{11}$ is a residue of a saturated aliphatic amino acid having 2 to 12 carbon atoms, a residue of an alicyclic amino acid having 7 to 9 carbon atoms, or a residue of an aromatic amino acid having 7 to 15 carbon atoms.

19. The polybutene-1 resin composition according to claim 17 wherein the amide compound is an amide compound represented by the formula (3) wherein R$^{11}$ is a residue of a saturated aliphatic amino acid having 2 to 5 carbon atoms, a residue of an alicyclic amino acid having 7 to 9 carbon atoms, or a residue of an aromatic amino acid having 7 to 11 carbon atoms, q is 1 or 2, r is 1 or 2, and the sum of q and r is equal to 2 or 3.

20. The polybutene-1 resin composition according to claim 17 wherein the amide compound is an amide compound represented by the formula (3) wherein R$^{11}$ is a residue formed by elimination of all the amino groups and all the carboxyl groups of β-aminopropionic acid, 8-aminocaprylic acid, aspartic acid, glutamic acid, p-aminomethylcyclohexanecarboxylic acid, 4-aminocyclohexanecarboxylic acid, 3,5-diaminocyclohexanecarboxylic acid, p-aminobenzoic acid, 5-amino-1-naphthoic acid, p-aminophenylacetic acid, 3,5-diaminobenzoic acid or 4,4'-diamino-3,3'-dicarboxydiphenylmethane.

21. The polybutene-1 resin composition according to claim 17 wherein the amide compound is an amide compound represented by the formula (3) wherein R$^{11}$ is a residue formed by elimination of all the amino groups and all the carboxyl groups of β-aminopropionic acid, aspartic acid, glutamic acid, 4-amino-cyclohexanecarboxylic acid or p-aminobenzoic acid.

22. The polybutene-1 resin composition according to claim 17 wherein the amide compound is an amide compound represented by the formula (3) wherein R$^{12}$ is an alkyl group having 3 to 6 carbon atoms, a cycloalkyl group having 4 to 8 carbon atoms, phenyl group, a group of the formula (a) wherein R$^3$ is an alkyl group having 1 to 8 carbon atoms or a halogen atom and i is an integer of 1 to 3, a group of the formula (c) wherein R$^6$ is an alkyl group having 1 to 6 carbon atoms or a halogen atom and n is an integer of 1 to 3, or a group of the formula (d) wherein R$^7$ is an alkylene group having 1 to 3 carbon atoms, R$^8$ is an alkyl group having 1 to 4 carbon atoms or a halogen atom and j is an integer of 0 to 3, R$^{13}$ is an alkyl group having 2 to 9 carbon atoms, a cycloalkyl group having 6 or 7 carbon atoms, phenyl group, a group of the formula (a) wherein R$^3$ is an alkyl group having 1 to 6 carbon atoms or a halogen atom and i is an integer of 1 to 3, a group of the formula (c)

wherein R⁶ is an alkyl group having 1 to 6 carbon atoms or a halogen atom and n is an integer of 1 to 3, or a group of the formula (d) wherein R⁷ is an alkylene group having 1 to 3 carbon atoms, R⁸ is an alkyl group having 1 to 4 carbon atoms or a halogen atom and j is an integer of 0 to 3, q is 1 or 2, r is 1 or 2, and the sum of q and r is equal to 2 or 3.

23. The polybutene-1 resin composition according to claim 17 wherein the amide compound is an amide compound represented by the formula (3) wherein R¹² is an alkyl group having 3 or 4 carbon atoms, cyclohexyl group, phenyl group, a group of the formula (a) wherein R³ is an alkyl group having 1 to 4 carbon atoms and i is an integer of 1 to 3, a group of the formula (c) wherein R⁶ is an alkyl group having 1 to 4 carbon atoms and n is an integer of 1 to 3, or a group of the formula (d) wherein R⁷ is methylene group, R⁸ is an alkyl group having 1 to 4 carbon atoms and j is an integer of 0 to 3, R¹³ is an alkyl group having 2 to 5 carbon atoms, cyclohexyl group, phenyl group, a group of the formula (a) wherein R³ is an alkyl group having 1 to 4 carbon atoms and i is an integer of 1 to 3, a group of the formula (c) wherein R⁶ is an alkyl group having 1 to 4 carbon atoms and n is an integer of 1 to 3, or a group of the formula (d) wherein R⁷ is methylene group, R⁸ is an alkyl group having 1 to 4 carbon atoms and j is an integer of 0 to 3, q is 1 or 2, r is 1 or 2, and the sum of q and r is equal to 2 or 3.

24. The polybutene-1 resin composition according to claim 1 wherein the amide compound is at least one compound selected from the group consisting of p-phenylenediacetic acid dianilide, p-phenylenediacetic acid dicyclohexylamide, tricarballylic acid tris(2-methylcyclohexylamide), adipic acid bis(2,6-dimethylanilide), butanetetracarboxylic acid tetracyclohexylamide, butanetetracarboxylic acid tetrabenzylamide, trimesic acid tris(t-butylamide), trimesic acid tricyclohexylamide, trimesic acid tris(2-methylcyclohexylamide), trimesic acid tribenzylamide, 1,4-cyclohexanedicarboxylic acid dianilide, N,N'-dibenzoyl-1,4-diaminocyclohexane, N,N'-dicyclohexanecarbonyl-p-phenylenediamine, N,N'-dibenzoyl-1,5-diaminonaphthalene, 1,4-cyclohexanedicarboxylic acid dicyclohexylamide, terephthalic acid dianilide, terephthalic acid dibenzylamide and p-(N-butylcarbonylamino)-benzoic acid butylamide.

25. The polybutene-1 resin composition according to claim 1 which comprises 0.001 to 10 parts by weight of the amide compound relative to 100 parts by weight of the polybutene-1 resin.

26. The polybutene-1 resin composition according to claim 1 wherein the polybutene-1 resin is a butene-1 homopolymer, a copolymer of butene-1 and another α-olefin which contains at least 70% by weight of butene-1, or a polymer blend comprising (a) 70 to 95% by weight of at least one member selected from said butene-1 homopolymer and said copolymer and (b) 5 to 30% by weight of at least one member selected from the group consisting of thermoplastic resins and elastomers.

27. A method for accelerating the crystal phase transformation of a polybutene-1 resin from Form-II (tetragonal crystal modification) into Form-I (hexagonal crystal modification), the method comprising the steps of a) molding a polybutene-1 resin composition consisting essentially of said polybutene-1 resin and at least one amide compound to obtain a molded product comprising Form-1 and b) allowing the molded product to stand at a temperature of about 0 to 50° C. to thereby cause transformation of Form-II to Form-I, said polybutene-1 resin being a butene-1 homopolymer, a copolymer of butene-1 and another α-olefin which contains at least 60% by weight of butene-1, or a polymer blend comprising (i) 60 to 99% by weight of at least one member selected from the group consisting of said butene-1 homopolymer and said butene-1 copolymer and (ii) 1 to 40% by weight of at least one member selected from the group consisting of thermoplastic resins and elastomers, said amide compound being at least one member selected from the group consisting of:

(1) polycarboxylic acid-type amide compounds represented by the formula (1)

wherein k is an integer of 2 to 6;

R¹ is a residue which is formed by elimination of all the carboxyl groups of a saturated or unsaturated aliphatic polycarboxylic acid having 3 to 16 carbon atoms, a residue which is formed by elimination of all the carboxyl groups of a saturated or unsaturated alicyclic polycarboxylic acid having 7 to 16 carbon atoms or a residue which is formed by elimination of all the carboxyl groups of an aromatic polycarboxylic acid having 8 to 22 carbon atoms; and R² is an alkyl group having 3 to 6 carbon atoms, an alkenyl group having 2 to 8 carbon atoms, a cycloalkyl group having 3 to 12 carbon atoms, a cycloalkenyl group having 3 to 12 carbon atoms, phenyl group, naphthyl group, anthryl group, a group represented by the formula (a), (b), (c) or (d);

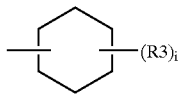

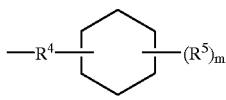

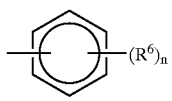

or

(wherein R³, R⁵, R⁶ and R⁸ are the same or different and each represents an alkyl group having 1 to 18 carbon atoms, an alkenyl group having 2 to 18 carbon atoms, an alkoxyl group having 1 to 8 carbon atoms, a cycloalkyl group having 3 to 12 carbon atoms, phenyl group or a halogen atom, $R^4$ and $R^7$ are the same or different and each represents a straight- or branched-chain alkylene group having 1 to 4 carbon atoms, i and n each represents an integer of 1 to 5, and m and j each represents an integer of 0 to 5), (2) polyamine-type amide compounds represented by the formula

$$R^9-(NHCO-R^{10})_p \qquad (2)$$

wherein $R^9$ is a residue which is formed by elimination of all the amino groups of a saturated or unsaturated alicyclic polyamine having 3 to 25 carbon atoms or a residue which is formed by elimination all the amino groups of an aromatic polyamine having 6 to 25 carbon atoms, $R^{10}$ has the same meaning as $R^2$ in the formula (1), and p is an integer of 2 to 6, and (3) amino acid-type amide compounds represented by the formula

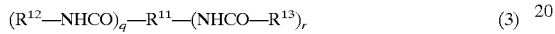

$$(R^{12}-NHCO)_q-R^{11}-(NHCO-R^{13})_r \qquad (3)$$

wherein $R^{11}$ is a residue which is formed by elimination of all the amino groups and all the carboxyl groups of a saturated aliphatic amino acid having 2 to 25 carbon atoms, a residue which is formed by elimination of all the amino groups and all the carboxyl groups of an unsaturated aliphatic amino acid having 3 to 25 carbon atoms, a residue which is formed by elimination of all the amino groups and all the carboxyl groups of a saturated or unsaturated alicyclic amino acid having 7 to 15 carbon atoms or a residue which is formed by elimination of all the amino groups and all the carboxyl groups of an aromatic amino acid having 7 to 25 carbon atoms, $R^{12}$ and $R^{13}$ each have the same meaning as $R^2$ in the formula (1) and are the same or different, and q and r each represents an integer of 1 to 5, and the sum of q plus r is equal to 2 to 6.

28. The method according to claim 27 wherein the amide compound is at least one amide compound represented by the formula (1).

29. The method according to claim 28 wherein the amide compound is at least one amide compound represented by the formula (1) wherein $R^1$ is a residue which is formed by elimination of all the carboxyl groups of a saturated aliphatic polycarboxylic acid having 4 to 10 carbon atoms, a residue which is formed by elimination of all the carboxyl groups of a saturated alicyclic polycarboxylic acid having 8 to 16 carbon atoms or a residue which is formed by elimination of all the carboxyl groups of an aromatic polycarboxylic acid having 8 to 17 carbon atoms.

30. The method according to claim 28 wherein $R^1$ is a residue formed by elimination of all the carboxyl groups of a polycarboxylic acid selected from the group consisting of p-phenylenediacetic acid, adipic acid, 2,6-naphthalenedicarboxylic acid, terephthalic acid, 1,4-cyclohexanedicarboxylic acid, trimesic acid, tricarballylic acid, DSTC (diphenylsulfonetetracarboxylic acid), TDA (3,4-dicarboxy-1,2,3,4-tetrahydro-1-naphthalenesuccinic acid), BTC (1,2,3,4-butanetetracarboxylic acid) and 4,4'-sulfonyldibenzoic acid.

31. The method according to claim 28 wherein $R^1$ is a residue formed by elimination of all the carboxyl groups of trimesic acid.

32. The method according to claim 28 wherein the amide compound is at least one amide compound of the formula (1) wherein k is 3, $R^1$ is a residue which is formed by elimination of all the carboxyl groups of a saturated aliphatic tricarboxylic acid having 6 to 10 carbon atoms, a residue which is formed by elimination of all the carboxyl groups of a saturated alicyclic tricarboxylic acid having 8 to 12 carbon atoms or a residue which is formed by elimination of all the carboxyl groups of an aromatic tricarboxylic acid having 9 to 12 carbon atoms, and $R^2$ is an alkyl group having 3 to 6 carbon atoms, a cycloalkyl group having 4 to 8 carbon atoms, phenyl group, a group of the formula (a) wherein $R^3$ is an alkyl group having 1 to 8 carbon atoms or a halogen atom and i is an integer of 1 to 3, a group of the formula (c) wherein $R^6$ is an alkyl group having 1 to 6 carbon atoms or a halogen atom and n is an integer of 1 to 3, or a group of the formula (d) wherein $R^7$ is an alkylene group having 1 to 3 carbon atoms, $R^8$ is an alkyl group having 1 to 4 carbon atoms or a halogen atom and j is an integer of 0 to 3.

33. The method according to claim 28 wherein the amide compound is at least one amide compound of the formula (1) wherein k is 3, $R^1$ is a residue formed by removing all the carboxyl groups from a tricarboxylic acid selected from the group consisting of trimesic acid, tricarballylic acid and 1,3,5-pentanetricarboxylic acid, and $R^2$ is an alkyl group having 3 or 4 carbon atoms, cyclohexyl group, phenyl group, a group of the formula (a) wherein $R^3$ is an alkyl group having 1 to 4 carbon atoms and i is an integer of 1 to 3, a group of the formula (c) wherein $R^6$ is an alkyl group having 1 to 4 carbon atoms and n is an integer of 1 to 3, or a group of the formula (d) wherein $R^7$ is methylene group, $R^8$ is an alkyl group having 1 to 4 carbon atoms and j is an integer of 0 to 3.

34. The method according to claim 28 wherein the amide compound is at least one amide compound of the formula (1) wherein k is 2, $R^1$ is a residue which is formed by elimination of all the carboxyl groups of a saturated aliphatic dicarboxylic acid having 4 to 10 carbon atoms, a residue which is formed by elimination of all the carboxyl groups of a saturated alicyclic dicarboxylic acid having 7 to 10 carbon atoms or a residue which is formed by elimination of all the carboxyl groups of an aromatic dicarboxylic acid having 8 to 17 carbon atoms, and $R^2$ is an alkyl group having 3 or 6 carbon atoms, a cycloalkyl group having 4 to 8 carbon atoms, phenyl group, a group of the formula (a) wherein $R^3$ is an alkyl group having 1 to 8 carbon atoms or a halogen atom and i is an integer of 1 to 3, a group of the formula (c) wherein $R^6$ is an alkyl group having 1 to 6 carbon atoms or a halogen atom and n is an integer of 1 to 3, or a group of the formula (d) wherein $R^7$ is an alkylene group having 1 to 3 carbon atoms, $R^8$ is an alkyl group having 1 to 4 carbon atoms or a halogen atom and j is an integer of 0 to 3.

35. The method according to claim 28 wherein the amide compound is at least one amide compound of the formula (1) wherein k is 2, $R^1$ is a residue formed by removing all the carboxyl groups from a dicarboxylic acid selected from the group consisting of p-phenylenediacetic acid, adipic acid, 2,6-naphthalenedicarboxylic acid, terephthalic acid, 1,4-cyclohexanedicarboxylic acid and 4,4'-sulfonyldibenzoic acid, and $R^2$ is an alkyl group having 3 or 4 carbon atoms, cyclohexyl group, phenyl group, a group of the formula (a) wherein $R^3$ is an alkyl group having 1 to 4 carbon atoms and i is an integer of 1 to 3, a group of the formula (c) wherein $R^6$ is an alkyl group having 1 to 4 carbon atoms and n is an integer of 1 to 3, or a group of the formula (d) wherein $R^7$ is methylene group, $R^8$ is an alkyl group having 1 to 4 carbon atoms and j is an integer of 0 to 3.

36. The method according to claim 28 wherein the amide compound is sulfonyldibenzoic acid dianilide.

37. The method according to claim 36 wherein the amide compound is 4,4'-sulfonyldibenzoic acid dianilide.

38. The method according to claim 27 wherein the amide compound is at least one amide compound represented by the formula (2).

39. The method according to claim 38 wherein the amide compound is at least one amide compound represented by the formula (2) wherein $R^9$ is a residue of a saturated alicyclic polyamine having 6 to 15 carbon atoms or a residue of an aromatic polyamine having 6 to 17 carbon atoms.

40. The method according to claim 38 wherein the amide compound is at least one amide compound represented by the formula (2) wherein $R^9$ is a residue formed by elimination of all the amino groups of p-phenylenediamine, 1,5-diamino-naphthalene, 4,4'-diaminodiphenylmethane, 4,4'-diaminodiphenylether, 4,4'-diaminodiphenylsulfone, 1,4-diaminocyclohexane, 4,4'-diaminodicyclohexylmethane, tris(4-aminophenyl)methane, 3,31-diaminobenzidine or melamine.

41. The method according to claim 38 wherein the amide compound is at least one amide compound represented by the formula (2) wherein p is 2 or 3, $R^9$ is a residue of a saturated alicyclic di- or triamine having 6 to 13 carbon atoms or a residue of an aromatic di- or triamine having 6 to 13 carbon atoms, and $R^{10}$ is an alkyl group having 2 to 9 carbon atoms, a cycloalkyl group having 6 or 7 carbon atoms, phenyl group, a group of the formula (a) wherein $R^3$ is an alkyl group having 1 to 6 carbon atoms or a halogen atom and i is an integer of 1 to 3, a group of the formula (c) wherein $R^6$ is an alkyl group having 1 to 6 carbon atoms or a halogen atom and n is an integer of 1 to 3, or a group of the formula (d) wherein $R^7$ is an alkylene group having 1 to 3 carbon atoms, $R^8$ is an alkyl group having 1 to 4 carbon atoms or a halogen atom and j is an integer of 0 to 3.

42. The method according to claim 38 wherein the amide compound is at least one amide compound represented by the formula (2) wherein p is 2, $R^9$ is a residue formed by removing all the amino groups from a diamine selected from the group consisting of p-phenylenediamine, 1,5-diaminonaphthalene, 4,4'-diaminodiphenylmethane, 4,4'-diaminodiphenylether, 4,4'-diaminodiphenylsulfone, 1,4-diaminocyclohexane and 4,4'-diaminodicyclohexylmethane, and $R^{10}$ is an alkyl group having 2 to 5 carbon atoms, a cyclohexyl group, phenyl group, a group of the formula (a) wherein $R^3$ is an alkyl group having 1 to 4 carbon atoms and i is an integer of 1 to 3, a group of the formula (c) wherein $R^6$ is an alkyl group having 1 to 4 carbon atoms and n is an integer of 1 to 3, or a group of the formula (d) wherein $R^7$ is methylene group, $R^8$ is an alkyl group having 1 to 4 carbon atoms and j is an integer of 0 to 3.

43. The method according to claim 27 wherein the amide compound is at least one amide compound represented by the formula (3).

44. The method according to claim 43 wherein the amide compound is an amide compound represented by the formula (3) wherein $R^{11}$ is a residue of a saturated aliphatic amino acid having 2 to 12 carbon atoms, a residue of an alicyclic amino acid having 7 to 9 carbon atoms, or a residue of an aromatic amino acid having 7 to 15 carbon atoms.

45. The method according to claim 43 wherein the amide compound is represented by the formula (3) wherein $R^{11}$ is a residue of a saturated aliphatic amino acid having 2 to 5 carbon atoms, a residue of an alicyclic amino acid having 7 to 9 carbon atoms, or a residue of an aromatic amino acid having 7 to 11 carbon atoms, q is 1 or 2, r is 1 or 2, and the sum of q and r is equal to 2 or 3.

46. The method according to claim 43 wherein the amide compound is an amide compound represented by the formula (3) wherein $R^{11}$ is a residue formed by elimination of all the amino groups and all the carboxyl groups of β-aminopropionic acid, 8-aminocaprylic acid, aspartic acid, glutamic acid, p-aminomethylcyclohexanecarboxylic acid, 4-amino-cyclohexanecarboxylic acid, 3,5-diaminocyclohexane-carboxylic acid, p-aminobenzoic acid, 5-amino-1-naphthoic acid, p-aminophenylacetic acid, 3,5-diaminobenzoic acid or 4,4'-diamino-3,3'-dicarboxydiphenylmethane.

47. The method according to claim 43 wherein the amide compound is an amide compound represented by the formula (3) wherein $R^{11}$ is a residue formed by elimination of all the amino groups and all the carboxyl groups of β-aminopropionic acid, aspartic acid, glutamic acid, 4-amino-cyclohexanecarboxylic acid or p-aminobenzoic acid.

48. The method according to claim 43 wherein the amide compound is an amide compound represented by the formula (3) wherein $R^{12}$ is an alkyl group having 3 to 6 carbon atoms, a cycloalkyl group having 4 to 8 carbon atoms, phenyl group, a group of the formula (a) wherein $R^3$ is an alkyl group having 1 to 8 carbon atoms or a halogen atom and i is an integer of 1 to 3, a group of the formula (c) wherein $R^6$ is an alkyl group having 1 to 6 carbon atoms or a halogen atom and n is an integer of 1 to 3, or a group of the formula (d) wherein $R^7$ is an alkylene group having 1 to 3 carbon atoms, $R^8$ is an alkyl group having 1 to 4 carbon atoms or a halogen atom and j is an integer of 0 to 3, $R^{13}$ is an alkyl group having 2 to 9 carbon atoms, a cycloalkyl group having 6 or 7 carbon atoms, phenyl group, a group of the formula (a) wherein $R^3$ is an alkyl group having 1 to 6 carbon atoms or a halogen atom and i is an integer of 1 to 3, a group of the formula (c) wherein $R^6$ is an alkyl group having 1 to 6 carbon atoms or a halogen atom and n is an integer of 1 to 3, or a group of the formula (d) wherein $R^7$ is an alkylene group having 1 to 3 carbon atoms, $R^8$ is an alkyl group having 1 to 4 carbon atoms or a halogen atom and j is an integer of 0 to 3, q is 1 or 2, r is 1 or 2, and the sum of q and r is equal to 2 or 3.

49. The method according to claim 43 wherein the amide compound is an amide compound represented by the formula (3) wherein $R^{12}$ is an alkyl group having 3 or 4 carbon atoms, cyclohexyl group, phenyl group, a group of the formula (a) wherein $R^3$ is an alkyl group having 1 to 4 carbon atoms and i is an integer of 1 to 3, a group of the formula (c) wherein $R^6$ is an alkyl group having 1 to 4 carbon atoms and n is an integer of 1 to 3, or a group of the formula (d) wherein $R^7$ is methylene group, $R^8$ is an alkyl group having 1 to 4 carbon atoms and j is an integer of 0 to 3, $R^{13}$ is an alkyl group having 2 to 5 carbon atoms, a cyclohexyl group, phenyl group, a group of the formula (a) wherein $R^3$ is an alkyl group having 1 to 4 carbon atoms and i is an integer of 1 to 3, a group of the formula (c) wherein $R^6$ is an alkyl group having 1 to 4 carbon atoms and n is an integer of 1 to 3, or a group of the formula (d) wherein $R^7$ is methylene group, $R^8$ is an alkyl group having 1 to 4 carbon atoms and j is an integer of 0 to 3, q is 1 or 2, r is 1 or 2, and the sum of q and r is equal to 2 or 3.

50. The method according to claim 27 wherein the amide compound is at least one compound selected from the group consisting of p-phenylenediacetic acid dianilide, p-phenylenediacetic acid dicyclohexylamide, tricarballylic acid tris(2-methylcyclohexylamide), adipic acid bis(2,6-dimethylanilide), butanetetracarboxylic acid tetracyclohexylamide, butanetetracarboxylic acid tetrabenzylamide, trimesic acid tris(t-butylamide), trimesic acid tricyclohexylamide, trimesic acid tris(2-methylcyclohexylamide), trimesic acid tribenzylamide, 1,4-cyclohexanedicarboxylic acid dianilide, N,N'-dibenzoyl-1,4-diaminocyclohexane, N,N'-dicyclohexanecarbonyl-p-phenylenediamine, N,N'-dibenzoyl-1,5-diaminonaphthalene, 1,4-cyclohexanedicarboxylic acid dicyclohexylamide, terephthalic acid dianilide, terephthalic acid dibenzylamide and p-(N-butylcarbonylamino)-benzoic acid butylamide.

51. The method according to claim 27 which comprises 0.001 to 10 parts by weight of the amide compound relative to 100 parts by weight of the polybutene-1 resin.

52. The method according to claim 27 wherein the polybutene-1 resin is a butene-1 homopolymer, a copolymer of butene-1 and another α-olefin which contains at least 60% by weight of butene-1, or a polymer blend comprising (i) 70 to 95% by weight of at least one member selected from said butene-1 homopolymer and said copolymer and (ii) 5 to 30% by weight of at least one member selected from the group consisting of thermoplastic resins and elastomers.

53. A process for producing a polybutene-1 resin molded article comprising Form-I and Form-III crystal modifications, the process comprising the steps of a) molding a polybutene-1 resin composition consisting essentially of a polybutene-1 resin and sulfonyldibenzoic acid dianilide to obtain a molded product comprising Form-II and Form-III, and b) allowing the molded product to stand at a temperature of about 0 to 50° C. to thereby cause transformation of Form-II to Form-II, wherein said polybutene-1 resin is a butene-1 homopolymer, a copolymer of butene-1 and another α-olefin which contains at least 60% by weight of butene-1, or a polymer blend comprising (i) at least one member selected from the group consisting of said butene-1 homopolymer and said butene-1 copolymer as the major component and (ii) at least one member selected from the group consisting of thermoplastic resins and elastomers as a minor component.

54. The process according to claim 53 wherein the sulfonyldibenzoic acid dianilide is 4,4'-sulfonyldibenzoic acid dianilide.

55. The polybutene-1 resin composition according to claim 7 wherein $R^1$ is a residue which is formed by elimination of all the carboxyl groups of trimesic acid.

56. The polybutene-1 resin composition according to claim 9 wherein $R^1$ is a residue which is formed by removing all the carboxyl groups from 1,4-cyclohexanedicarboxylic acid.

57. The polybutene-1 resin composition according to claim 33 wherein $R^1$ is a residue which is formed by elimination of all the carboxyl groups of trimesic acid.

58. The polybutene-1 resin composition according to claim 35 wherein $R^1$ is a residue which is formed by removing all the carboxyl groups from 1,4-cyclohexanedicarboxylic acid.

* * * * *